US009823473B2

(12) United States Patent
Kobayashi

(10) Patent No.: US 9,823,473 B2
(45) Date of Patent: Nov. 21, 2017

(54) HEAD-MOUNTED DISPLAY DEVICE AND CONTROL METHOD FOR HEAD-MOUNTED DISPLAY DEVICE

(71) Applicant: Seiko Epson Corporation, Tokyo (JP)

(72) Inventor: Shinichi Kobayashi, Azumino (JP)

(73) Assignee: Seiko Epson Corporation, Tokyo (JP)

( * ) Notice: Subject to any disclaimer, the term of this patent is extended or adjusted under 35 U.S.C. 154(b) by 97 days.

(21) Appl. No.: 14/206,639

(22) Filed: Mar. 12, 2014

(65) Prior Publication Data

US 2014/0285403 A1 Sep. 25, 2014

(30) Foreign Application Priority Data

Mar. 22, 2013 (JP) .................................. 2013-059593

(51) Int. Cl.
| G09G 5/00 | (2006.01) |
| G02B 27/01 | (2006.01) |
| G06F 3/01 | (2006.01) |
| G02B 27/00 | (2006.01) |

(52) U.S. Cl.
CPC ....... *G02B 27/017* (2013.01); *G02B 27/0093* (2013.01); *G06F 3/011* (2013.01); *G06F 3/013* (2013.01); *G02B 2027/014* (2013.01)

(58) Field of Classification Search
CPC .............. G02B 27/017; G02B 27/0172; G02B 2027/0174; G02B 27/0176; G02B 2027/0178; G02B 27/0179; G02B 2027/0181
See application file for complete search history.

(56) References Cited

U.S. PATENT DOCUMENTS

| 5,621,424 A | 4/1997 | Shimada et al. |
| 2006/0090135 A1 | 4/2006 | Fukuda |
| 2011/0128364 A1 | 6/2011 | Ono |
| 2012/0242560 A1 | 9/2012 | Nakada et al. |
| 2013/0113973 A1* | 5/2013 | Miao ...................... G09G 3/003 348/333.01 |
| 2014/0002491 A1* | 1/2014 | Lamb et al. ................... 345/633 |
| 2014/0132629 A1* | 5/2014 | Pandey et al. ................ 345/633 |
| 2015/0097873 A1 | 4/2015 | Nakada et al. |
| 2016/0070108 A1 | 3/2016 | Nakada et al. |

FOREIGN PATENT DOCUMENTS

| JP | 06-078247 A | 3/1994 |
| JP | 07-261112 A | 10/1995 |
| JP | 2000-221953 A | 8/2000 |

(Continued)

*Primary Examiner* — Hang Lin
(74) *Attorney, Agent, or Firm* — ALG Intellectual Property, LLC

(57) ABSTRACT

A head-mounted display device that enables a user to visually recognize a virtual image and an outside scene includes an image display unit configured to cause the user to visually recognize the virtual image, a detecting unit configured to detect a visual line direction of the user, and a display switching unit configured to switch, according to the detected visual line direction, display of the virtual image by the image display unit between outside scene preferential display for preferentially displaying the outside scene and virtual image preferential display for preferentially displaying the virtual image.

17 Claims, 14 Drawing Sheets

(56) References Cited

FOREIGN PATENT DOCUMENTS

| | | |
|---|---|---|
| JP | 2004-021931 A | 1/2004 |
| JP | 3735086 B | 1/2006 |
| JP | 2008-219286 A | 9/2008 |
| JP | 2009-253786 A | 10/2009 |
| JP | 2011-114781 A | 6/2011 |
| JP | 2012-203128 A | 10/2012 |

* cited by examiner

HEAD-MOUNTED DISPLAY DEVICE AND CONTROL METHOD FOR HEAD-MOUNTED DISPLAY DEVICE

BACKGROUND

1. Technical Field

The present invention relates to a head-mounted display device.

2. Related Art

There is known a technique called augmented reality (AR) for additionally presenting information in a real environment using a computer. As a method of realizing the augmented reality, a method by image recognition and a method based on a pass-through system are known. In the method by image recognition, information for additional presentation is generated by recognizing an image of an outside scene picked up by a WEB camera or the like. In the method based on the pass-through system, information for additional presentation is generated using present position information acquired by a GPS or the like and direction information acquired by an electronic compass or the like. In a non-transmissive head-mounted display device that blocks a visual field of a user when mounted, an image obtained by superimposing the image of the outside scene and the information for additional presentation generated as explained above is displayed on a liquid crystal display. Consequently, the user can feel the augmented reality. On the other hand, in a transmissive head-mounted display device that does not block a visual field of a user when mounted, only the information for additional presentation generated as explained above is displayed on a liquid crystal display. The user can feel the augmented reality by visually recognizing both of the information for additional presentation displayed as a virtual image via the liquid crystal display and a real outside scene seen through lenses in front of the eyes.

There is known a technique for informing, making use of the augmented reality explained above, a user of work content and a work procedure that the user should perform. For example, Japanese Patent No. 3735086 (Patent Literature 1) describes a technique for, in causing a translucent liquid crystal display panel included in a transmissive head-mounted display device to display an animation, superimposing the animation on a work target itself that a user visually recognizes via the liquid crystal panel. JP-A-2011-114781 (Patent Literature 2) describes a technique for selecting, in a retina scanning type head-mounted display device, information related to work being performed by a user and enabling the user to visually recognize an image based on the information.

With the techniques described in Patent Literatures 1 and 2, it is possible to support work performed by the user. However, when the user is about to start work keeping in mind the animation or the image displayed as a virtual image, the virtual image displayed in front of the eyes of the user is likely to block the visual field of the user and hinder the work.

Such a problem occurs not only in the work support that makes use of the augmented reality. Such a problem is common to display of a virtual image in general in a head-mounted display device that enables a user to visually recognize a virtual image and an outside scene such as the transmissive head-mounted display device and the retina scanning type head-mounted display device.

Therefore, there is a demand for a head-mounted display device capable of improving visibility of an outside scene according to the intention of a user.

SUMMARY

An advantage of some aspects of the invention is to solve at least a part of the problems described above, and the invention can be implemented as the following aspects.

(1) An aspect of the invention provides a head-mounted display device that enables a user to visually recognize a virtual image and an outside scene. The head-mounted display device includes: an image display unit configured to cause the user to visually recognize the virtual image; a detecting unit configured to detect a visual line direction of the user; and a display switching unit configured to switch, according to the detected visual line direction, display of the virtual image by the image display unit between outside scene preferential display for preferentially displaying the outside scene and virtual image preferential display for preferentially displaying the virtual image. With the head-mounted display device in this aspect, an object that the user intends to see, that is, the intention of the user is reflected on the visual line direction of the user detected by the detecting unit. The display switching unit switches, according to the visual line direction, the display of the virtual image by the image display unit between the outside scene preferential display for preferentially displaying the outside scene and improving visibility of the outside scene and the virtual image preferential display for preferentially displaying the virtual image. As a result, in the head-mounted display device, it is possible to improve the visibility of the outside scene according to the intention of the user.

(2) The head-mounted display device of the aspect described above may further include a changing unit configured to change, according to a state of use of the head-mounted display device, sensitivity of the detection by the detecting unit. With the head-mounted display device in this aspect, the changing unit can change the sensitivity of the detection by the detecting unit according to the state of use of the head-mounted display device. Therefore, the display switching unit can change, according to the state of use of the head-mounted display device, fine switching of the outside scene preferential display and the virtual image preferential display and rough switching of the outside scene preferential display and the virtual image preferential display. As a result, it is possible to improve convenience of use of the head-mounted display device for the user.

(3) In the head-mounted display device in the aspect described above, the changing unit may change the sensitivity of the detection to be low when the state of use is dynamic and change the sensitivity of the detection to be high when the state of use is static. With the head-mounted display device in this aspect, the changing unit changes the sensitivity of the detection by the detecting unit to be low in a dynamic state of use in which the body, the head, and the visual line of the user often rapidly change. Therefore, it is possible to suppress an excessive change in the visual line direction detected by the detecting unit. The changing unit changes the sensitivity of the detection by the detecting unit to be high in a static state of use in which the body, the head, and the visual line of the user do not change so much. Therefore, the detecting unit can detect even a small change in the visual line.

(4) The head-mounted display device in the aspect described above may further include a motion detecting unit configured to detect a motion of the head of the user. The changing unit may estimate, using the detected motion of the head, whether the state of use is dynamic or static. With the head-mounted display device in this aspect, the changing unit can estimate, using the motion of the head of the user detected by the motion detecting unit, whether the state of use is dynamic or static and automatically change the sensitivity of the detection by the detecting unit.

(5) In the head-mounted display device in the aspect described above, the visual line direction may include at least a first direction in which the visual line of the user is directed to a substantially forward direction and a second direction in which the visual line of the user is directed to a substantially vertical direction. With the head-mounted display device in this aspect, it is possible to clarify that at least the first direction in which the visual line of the user is directed to the substantially forward direction and the second direction in which the visual line of the user is directed to the substantially vertical direction are included in the visual line direction.

(6) In the head-mounted display device in the aspect described above, the display switching unit may include at least two operation modes, i.e., a first operation mode and a second operation mode. In the first operation mode, the display switching unit may switch the display of the virtual image by the image display unit to the virtual image preferential display when the visual line direction is the first direction and switch the display of the virtual image by the image display unit to the outside scene preferential display when the visual line direction is the second direction. In the second operation mode, the display switching unit may switch the display of the virtual image by the image display unit to the outside scene preferential display when the visual line direction is the first direction and switch the display of the virtual image by the image display unit to the virtual image preferential display when the visual line direction is the second direction. With the head-mounted display device in this aspect, in the first operation mode, the display switching unit switches the display of the virtual image by the image display unit to the virtual image preferential display when the visual line direction is the first direction and switches the display of the virtual image by the image display unit to the outside scene preferential display when the visual line direction is the second direction. Therefore, it is possible to improve the visibility of the outside scene when the user directs the visual line downward. In the second operation mode, the display switching unit switches the display of the virtual image by the image display unit to the outside scene preferential display when the visual line direction is the first direction and switches the display of the virtual image by the image display unit to the virtual image preferential display when the visual line direction is the second direction. Therefore, it is possible to improve the visibility of the outside scene when the user directs the visual line forward. In this way, the display switching unit includes a plurality of operation modes in which visual line directions for improving the visibility of the outside scene are different. Therefore, the user can cause the display switching unit to operate in an operation mode corresponding to the preference of the user. As a result, it is possible to improve the convenience of use of the head-mounted display device for the user.

(7) In the head-mounted display device in the aspect described above, the display switching unit may perform the outside scene preferential display using means for not displaying the virtual image, reducing a display size of the virtual image, thinning the display of the virtual image, or setting a display place of the virtual image in the vicinity of an end of a visual field of the user. With the head-mounted display device in this aspect, the display switching unit can use, in the outside scene preferential display, the means for not displaying the virtual image, reducing the display size of the virtual image, thinning the display of the virtual image, or setting the display place of the virtual image in the vicinity of the end of the visual field of the user. If the virtual image is not displayed, it is possible to improve the visibility of the outside scene. If the display size of the virtual image is reduced, it is possible to improve the visibility of the outside scene in other portions where the virtual image is not displayed. If the display of the virtual image is thinned, it is possible to improve the visibility of the outside scene that the user visually recognizes through the virtual image. If the display place of the virtual image is set in the vicinity of the end of the visual field of the user, it is possible to improve the visibility of the outside scene in other portions where the virtual image is not displayed.

Not all of a plurality of components in the aspects of the invention are essential. In order to solve a part or all of the problems or in order to attain a part or all of effects described in this specification, it is possible to perform change, deletion, replacement with new components, and partial deletion of limited contents concerning a part of the plurality of components as appropriate. In order to solve a part or all of the problems or in order to attain a part or all of the effects described in this specification, it is also possible to form one independent aspect of the invention by combining a part or all of the technical features included in one aspect of the invention explained above with a part or all of the technical features included in the other aspects of the invention explained above.

For example, one aspect of the invention can be realized as a device including a part or all of the three components, i.e., the image display unit, the detecting unit, and the display switching unit. That is, the device may or may not include the image display unit. The device may or may not include the detecting unit. The device may or may not include the display switching unit. Such a device can be realized as, for example, a head-mounted display device. However, the device can also be realized as devices other than the head-mounted display device. A part or all of the technical features of the aspects of the head-mounted display device can be applied to the device.

Note that the invention can be realized in various forms. For example, the invention can be realized in forms such as a head-mounted display device, a control method for the head-mounted display device, a head-mounted display system, a computer program for realizing functions of the method, the device, or the system, and a recording medium having the computer program recorded therein.

BRIEF DESCRIPTION OF THE DRAWINGS

The invention will be described with reference to the accompanying drawings, wherein like numbers reference like elements.

DESCRIPTION OF EXEMPLARY EMBODIMENTS

A. First Embodiment

A-1. Configuration of a Head-Mounted Display Device

Figure 1:
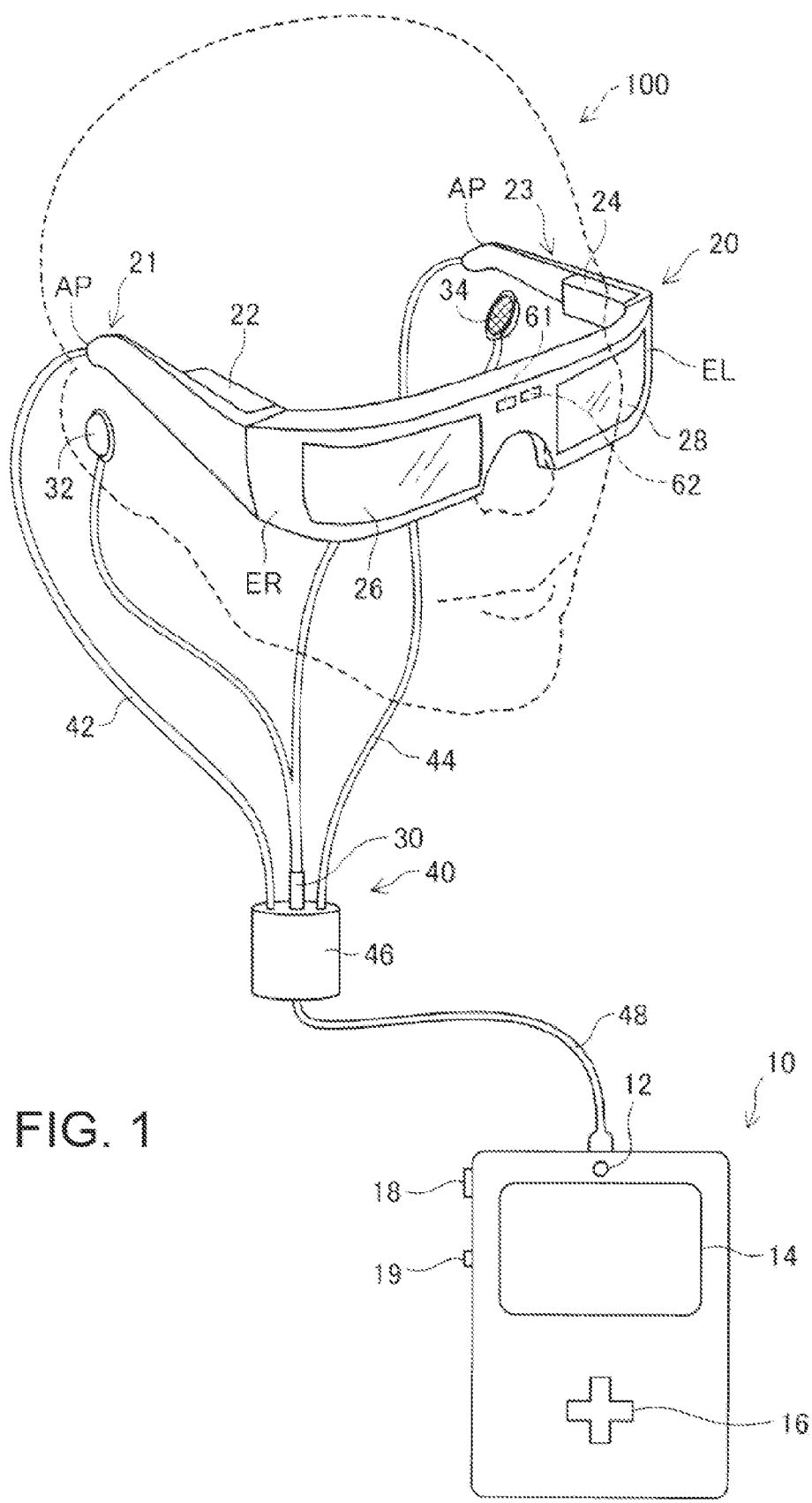
FIG. 1 is an explanatory diagram showing the schematic configuration of a head-mounted display device in a first embodiment of the invention.

FIG. 1 is an explanatory diagram showing the schematic configuration of a head-mounted display device in a first embodiment of the invention. A head-mounted display device 100 is a display device mounted on the head and is also called head mounted display (HMD). The head mounted display 100 in this embodiment is an optically transmissive head-mounted display device that enables a user to visually recognize a virtual image and, at the same time, directly visually recognize an outside scene.

The head mounted display 100 includes an image display unit 20 configured to cause the user to visually recognize a virtual image in a state in which the image display unit 20 is mounted on the head of the user and a control unit (a controller) 10 configured to control the image display unit 20.

The image display unit 20 is a mounted body mounted on the head of the user. In this embodiment, the image display unit 20 has an eyeglass shape. The image display unit 20 includes a right holding unit 21, a right display driving unit 22, a left holding unit 23, a left display driving unit 24, a right optical-image display unit 26, a left optical-image display unit 28, a light emitting unit 61, and a light receiving unit 62. The right optical-image display unit 26 and the left optical-image display unit 28 are respectively arranged to be located in front of the right and left eyes of the user when the user wears the image display unit 20. One end of the right optical-image display unit 26 and one end of the left optical-image display unit 28 are connected to each other in a position corresponding to the middle of the forehead of the user when the user wears the image display unit 20.

The right holding unit 21 is a member provided to extend from an end ER, which is the other end of the right optical-image display unit 26, to a position corresponding to the temporal region of the user when the user wears the image display unit 20. Similarly, the left holding unit 23 is a member provided to extend from an end EL, which is the other end of the left optical-image display unit 28, to a position corresponding to the temporal region of the user when the user wears the image display unit 20. The right holding unit 21 and the left holding unit 23 hold the image display unit 20 on the head of the user in the same manner as temples of eyeglasses.

The right display driving unit 22 is arranged on the inner side of the right holding unit 21, in other words, a side opposed to the head of the user when the user wears the image display unit 20. The left display driving unit 24 is arranged on the inner side of the left holding unit 23. Note that, in the following explanation, the right holding unit 21 and the left holding unit 23 are collectively simply referred to as "holding unit" as well, the right display driving unit 22 and the left display driving unit 24 are collectively simply referred to as "display driving unit" as well, and the right optical-image display unit 26 and the left optical-image display unit 28 are collectively simply referred to as "optical-image display unit" as well.

The display driving unit includes liquid crystal displays (hereinafter referred to as "LCDs") 241 and 242 and projection optical systems 251 and 252 (see FIG. 2). Details of the configuration of the display driving unit are explained below. The optical-image display unit functioning as an optical member includes light guide plates 261 and 262 (see FIG. 2) and a dimming plate. The light guide plates 261 and 262 are formed of a light transmissive resin material or the like and guide image light output from the display driving unit to the eyes of the user. The dimming plate is a thin plate-like optical element and arranged to cover the front side (a side opposite to the side of the eyes of the user) of the image display unit 20. The dimming plate protects the light guide plates 261 and 262 and suppresses damage, adhesion of stain, and the like to the light guide plates 261 and 262. By adjusting the light transmittance of the dimming plate, it is possible to adjust an amount of external light entering the eyes of the user and adjust easiness of visual recognition of a virtual image. Note that the dimming plate can be omitted.

The light emitting unit 61 is arranged on the inner side of the image display unit 20 and in a position opposed to the middle of the forehead of the user when the user wears the image display unit 20. The light emitting unit 61 is a light emitting body that emits an infrared ray, which is invisible light. For example, an infrared-emitting diode can be used as the light emitting unit 61. The light receiving unit 62 is arranged on the inner side of the image display unit 20 and in a position opposed to the middle of the forehead of the user when the user wears the image display unit 20. The light receiving unit 62 is a light receiving body that receives an infrared ray, which is invisible light. For example, an infrared photodiode can be used as the light receiving unit 62.

The image display unit 20 further includes a connecting unit 40 for connecting the image display unit 20 to the control unit 10. The connecting unit 40 includes a main body cord 48 connected to the control unit 10, a right cord 42 and a left cord 44, which are two cords branching from the main body cord 48, and a coupling member 46 provided at a branching point. The right cord 42 is inserted into a housing of the right holding unit 21 from a distal end portion AP in an extending direction of the right holding unit 21 and connected to the right display driving unit 22. Similarly, the left cord 44 is inserted into a housing of the left holding unit 23 from a distal end portion AP in an extending direction of the left holding unit 23 and connected to the left display driving unit 24. A jack for connecting an earphone plug 30 is provided in the coupling member 46. A right earphone 32 and a left earphone 34 extend from the earphone plug 30.

The image display unit 20 and the control unit 10 perform transmission of various signals via the connecting unit 40. Connectors (not shown in the figure), which fit with each other, are respectively provided at an end of the main body cord 48 on the opposite side of the coupling member 46 and in the control unit 10. The control unit 10 and the image display unit 20 are connected and disconnected according to fitting and unfitting of the connector of the main body cord 48 and the connector of the control unit 10. For example, a metal cable or an optical fiber can be adopted as the right cord 42, the left cord 44, and the main body cord 48.

The control unit 10 is a device for controlling the head mounted display 100. The control unit 10 includes a lighting unit 12, a touch pad 14, a cross key 16, and a power switch 18. The lighting unit 12 notifies, with a light emission form thereof, an operation state (e.g., power-on or power-off) of the head mounted display 100. As the lighting unit 12, for example, an LED (Light Emitting Diode) can be used. The touch pad 14 detects touch operation on an operation surface of the touch pad 14 and outputs a signal corresponding to detected content. As the touch pad 14, various touch pads such as an electrostatic type, a pressure detection type, and an optical type can be adopted. The cross key 16 detects pressing operation for keys corresponding to up, down, left and right directions and outputs a signal corresponding to detected content. The power switch 18 detects slide operation of the switch to switch a state of a power supply of the head mounted display 100.

Figure 2:
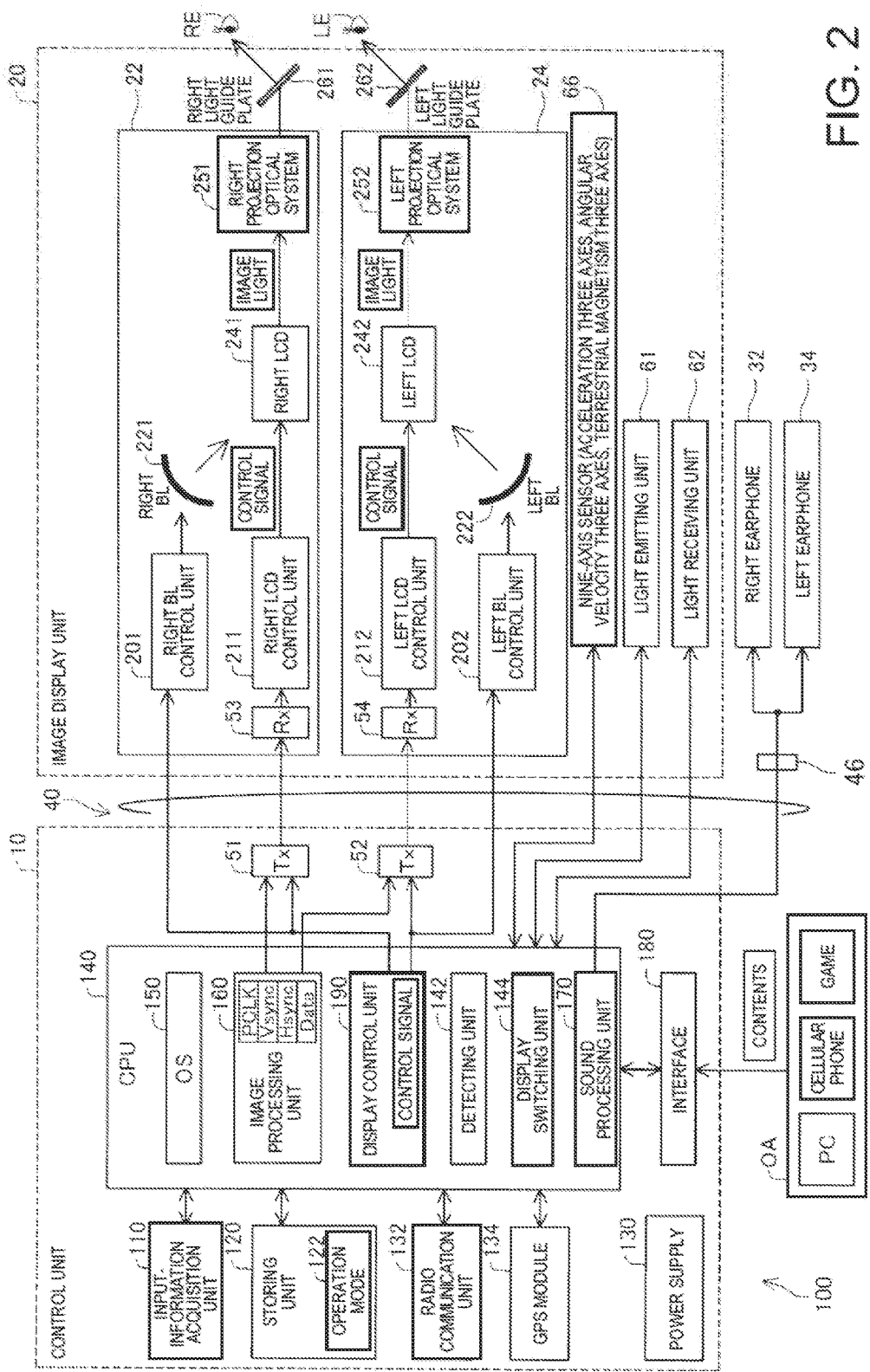
FIG. 2 is a block diagram functionally showing the configuration of a head mounted display.

FIG. 2 is a block diagram functionally showing the configuration of the head mounted display 100. The control unit 10 includes an input-information acquiring unit 110, a storing unit 120, a power supply 130, a radio communication unit 132, a GPS module 134, a CPU 140, an interface 180, and transmitting units (Tx) 51 and 52. The units are connected to one another by a not-shown bus.

The input-information acquiring unit 110 acquires, for example, a signal corresponding to an operation input to the touch pad 14, the cross key 16, the power switch 18, or the like. The storing unit 120 is configured by a ROM, a RAM, a DRAM, a hard disk, or the like. An operation mode 122 is stored in the storing unit 120. "Operation modes" of the display switching unit 144 set in advance are stored in the operation mode 122. The display switching unit 144 in this embodiment includes two operation modes explained below.

(1) A close-at-hand work mode for switching display of a virtual image to virtual image preferential display (details are explained below) when a visual line direction of the user is a substantially forward direction and switching the display of the virtual image to outside scene preferential display (details are explained below) when the visual line direction is a substantially vertical direction. The close-at-hand work mode is equivalent to a "first operation mode" in the appended claims.

(2) An on-the-spot broadcasting mode for switching the display of the virtual image to the outside scene preferential display when the visual line direction of the user is the substantially forward direction and switching the display to the virtual image preferential display when the visual line direction is the substantially vertical direction. The on-the-spot broadcasting mode is equivalent to a "second operation mode" in the appended claims.

The power supply 130 supplies electric power to the units of the head mounted display 100. As the power supply 130, for example, a secondary battery can be used. The radio communication unit 132 performs radio communication with other apparatuses according to a predetermined radio communication standard such as a wireless LAN or a Bluetooth. The GPS module 134 receives a signal from a GPS satellite to thereby detect the present position of the GPS module 134.

The CPU 140 reads out and executes a computer program stored in the storing unit 120 to thereby function as an operating system (OS) 150, an image processing unit 160, a sound processing unit 170, a display control unit 190, a detecting unit 142, and a display switching unit 144. The detecting unit 142 detects the direction of a visual line (hereinafter also referred to as "visual line direction") of the user using an output signal from the light receiving unit 62. Details are explained below. The display switching unit 144 executes display switching processing. The display switching processing is processing for switching, according to the visual line direction detected by the detecting unit 142, display of a virtual image by the image display unit 20 between outside scene preferential display for preferentially displaying an outside scene and virtual image preferential display for preferentially displaying a virtual image. Details are explained below. Note that the detecting unit 142, the light emitting unit 61, and the light receiving unit 62 are equivalent to a "detecting unit" in the appended claims.

The image processing unit 160 generates a signal on the basis of contents (a video) input via the interface 180 or the radio communication unit 132. The image processing unit 160 supplies the generated signal to the image display unit 20 via the connecting unit 40. The signal to be supplied to the image display unit 20 is different in an analog format and a digital format. In the case of the analog format, the image processing unit 160 generates and transmits a clock signal PCLK, a vertical synchronization signal VSync, a horizontal synchronization signal HSync, and image data Data. Specifically, the image processing unit 160 acquires an image signal included in the contents. The acquired image signal is, for example, in the case of a moving image, an analog signal generally including thirty frame images per one second. The image processing unit 160 separates synchronization signals such as the vertical synchronization signal VSync and the horizontal synchronization signal HSync from the acquired image signal and generates a clock signal PCLK using a PLL circuit or the like according to cycles of the synchronization signals. The image processing unit 160 converts the analog image signal, from which the synchronization signals are separated, into a digital image signal using an A/D conversion circuit or the like. The image processing unit 160 stores the digital image signal after the conversion in a DRAM in the storing unit 120 frame by frame as image data Data of RGB data. On the other hand, in the case of the digital format, the image processing unit 160 generates and transmits a clock signal PCLK and image data Data. Specifically, when the contents are the digital format, the clock signal PCLK is output in synchronization with the image signal. Therefore, the generation of the vertical synchronization signal VSync and the horizontal synchronization signal HSync and the A/D conversion for the analog image signal are unnecessary. The image processing unit 160 may execute image processing such as resolution conversion processing, various kinds of tone correction processing for adjustment of luminance and chroma, and keystone correction processing on the image data Data stored in the storing unit 120.

The image processing unit 160 transmits the clock signal PCLK, the vertical synchronization signal VSync, and the horizontal synchronization signal HSync generated by the image processing unit 160 and the image data Data stored in the DRAM in the storing unit 120 respectively via the transmitting units 51 and 52. The image data Data transmitted via the transmitting unit 51 is referred to as "image data for right eye Data1" as well. The image data Data transmitted via the communication unit 52 is referred to as "image data for left eye Data2" as well. The transmitting units 51 and 52 function as a transceiver for serial transmission between the control unit 10 and the image display unit 20.

The display control unit 190 generates control signals for controlling the right display driving unit 22 and the left display driving unit 24. Specifically, the display control unit 190 individually controls, using the control signals, ON/OFF of driving of the right LCD 241 by a right LCD control unit 211, ON/OFF of driving of a right backlight 221 by a right backlight control unit 201, ON/OFF of driving of the left LCD 242 by a left LCD control unit 212, and ON/OFF of driving of a left backlight 222 by a left backlight control unit 202 to thereby control generation and emission of image lights by the right display driving unit 22 and the left display driving unit 24. For example, the display control unit 190 causes both of the right display driving unit 22 and the left display driving unit 24 to generate image lights, causes one of the right display driving unit 22 and the left display driving unit 24 to generate image light, or causes both of the right display driving unit 22 and the left display driving unit 24 not to generate image light. The display control unit 190 transmits control signals to the right LCD control unit 211 and the left LCD control unit 212 respectively via the transmitting units 51 and 52. The display control unit 190 transmits control signals respectively to the right backlight control unit 201 and the left backlight control unit 202.

The sound processing unit 170 acquires a sound signal included in the contents, amplifies the acquired sound signal, and supplies the amplified sound signal to a not-shown speaker in the right earphone 32 or a not-shown speaker in the left earphone 34 connected to the coupling member 46. For example, when a Dolby (registered trademark) system is adopted, processing for the sound signal is performed. Different sounds, the frequencies or the like of which are varied, are respectively output from the right earphone 32 and the left earphone 34.

The interface 180 is an interface for connecting various external apparatuses OA, which are supply sources of contents, to the control unit 10. Examples of the external apparatuses OA include a personal computer PC, a cellular phone terminal, and a game terminal. As the interface 180, for example, a USB interface, a micro USB interface, or an interface for a memory card can be used.

The image display unit 20 includes the right display driving unit 22, the left display driving unit 24, the right light guide plate 261 functioning as the right optical-image display unit 26, the left light guide plate 262 functioning as the left optical-image display unit 28, the light emitting unit 61, the light receiving unit 62, and a nine-axis sensor 66.

The nine-axis sensor 66 is a motion sensor configured to detect acceleration (three axes), angular velocity (three axes), and terrestrial magnetism (three axes). Since the nine-axis sensor 66 is provided in the image display unit 20, when the image display unit 20 is mounted on the head of the user, the nine-axis sensor 66 functions as a motion detecting unit configured to detect a motion of the head of the user. The motion of the head includes the speed, the acceleration, the angular velocity, the direction, and a change in the direction of the head. Note that the nine-axis sensor 66 is equivalent to a "motion detecting unit" in the appended claims.

The right display driving unit 22 includes a receiving unit (Rx) 53, the right backlight (BL) control unit 201 and the right backlight (BL) 221 functioning as a light source, the right LCD control unit 211 and the right LCD 241 functioning as a display element, and the right projection optical system 251. Note that the right backlight control unit 201, the right LCD control unit 211, the right backlight 221, and the right LCD 241 are collectively referred to as "image-light generating unit" as well.

The receiving unit 53 functions as a receiver for serial transmission between the control unit 10 and the image display unit 20. The right backlight control unit 201 drives the right backlight 221 on the basis of an input control signal. The right backlight 221 is, for example, a light emitting body such as an LED or an electroluminescence (EL). The right LCD control unit 211 drives the right LCD 241 on the basis of the clock signal PCLK, the vertical synchronization signal VSync, the horizontal synchronization signal HSync, and the image data for right eye Data1 input via the receiving unit 53. The right LCD 241 is a transmissive liquid crystal panel on which a plurality of pixels are arranged in a matrix shape. The right LCD 241 drives liquid crystals in the positions of the pixels arranged in the matrix shape to thereby change the transmittance of light transmitted through the right LCD 241 to modulate illumination light irradiated from the right backlight 221 to effective image light representing an image. Note that, although the backlight system is adopted in this embodiment, the image light may be emitted using a front light system or a reflection system.

The right projection optical system 251 is configured by a collimate lens that changes the image light emitted from the right LCD 241 to light beams in a parallel state. The right light guide plate 261 functioning as the right optical-image display unit 26 guides the image light output from the right projection optical system 251 to a right eye RE of the user while reflecting the image light along a predetermined optical path. For the optical-image display unit, an arbitrary system can be used as long as the optical-image display unit forms a virtual image in front of the eyes of the user using the image light. For example, a diffraction grating may be used or a semitransparent reflection film may be used.

The left display driving unit 24 includes a configuration same as the configuration of the right display driving unit 22. That is, the left display driving unit 24 includes a receiving unit (Rx) 54, the left backlight (BL) control unit 202 and the left backlight (BL) 222 functioning as a light source, the left LCD control unit 212 and the left LCD 242 functioning as a display element, and the left projection optical system 252.

Figure 3:
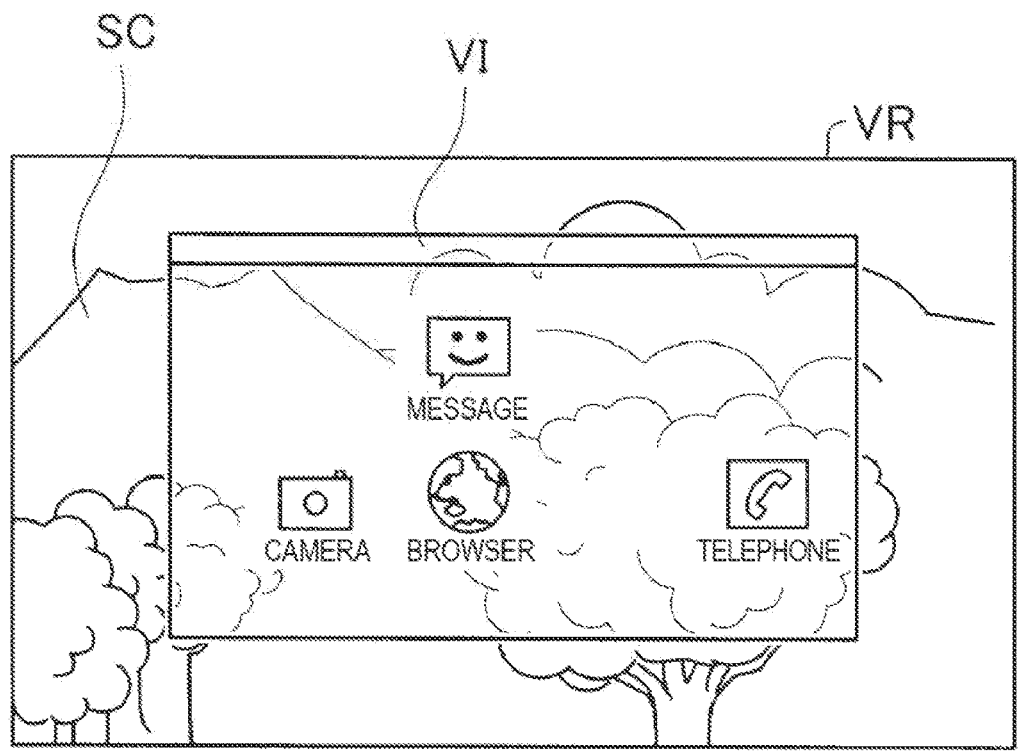
FIG. 3 is an explanatory diagram showing an example of a virtual image visually recognized by a user.

FIG. 3 is an explanatory diagram showing an example of a virtual image visually recognized by the user. In FIG. 3, a visual field VR of the user is illustrated. Image light guided to the eyes of the user of the head mounted display 100 is imaged on the retinas of the user as explained above, whereby the user visually recognizes a virtual image VI. In the example shown in FIG. 3, the virtual image VI is a standby screen of an OS of the head mounted display 100. The user visually recognizes an outside scene SC through the right optical-image display unit 26 and the left optical-image display unit 28. In this way, the user of the head mounted display 100 can view the virtual image VI and the outside scene SC behind the virtual image VI in a portion where the virtual image VI is displayed in the visual field VR. In a portion where the virtual image VI is not displayed in the visual field VR, the user can directly view the outside scene SC through the optical-image display unit.

A-2. Display Switching Processing

Figure 4:
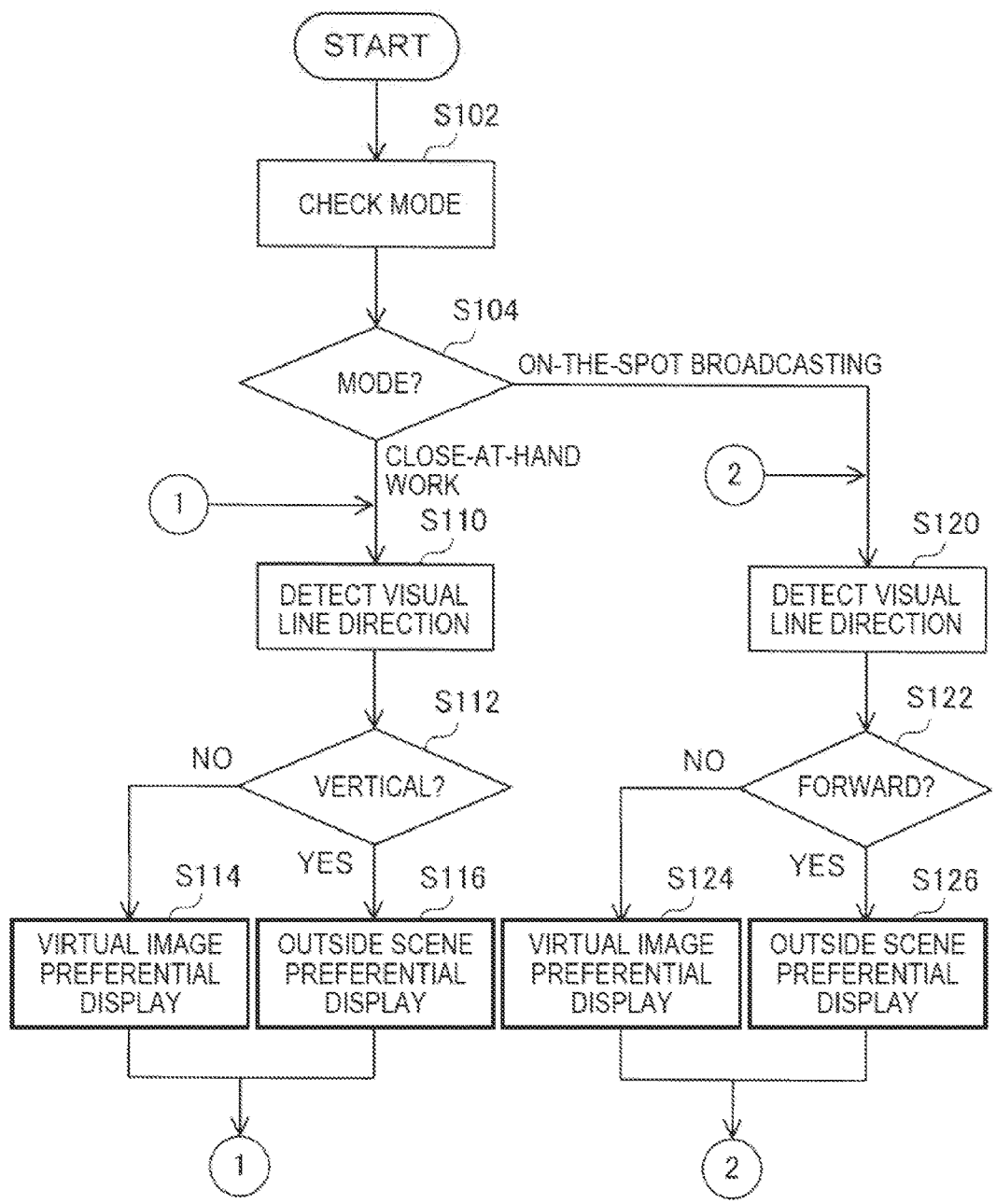
FIG. 4 is a flowchart showing a procedure of display switching processing.

FIG. 4 is a flowchart for explaining a procedure of display switching processing. The display switching processing is processing for switching, according to a visual line direction of the user, display of a virtual image by the image display unit 20 between outside scene preferential display for preferentially displaying an outside scene and virtual image preferential display for preferentially displaying the virtual image. A start trigger for the display switching processing can be arbitrarily set. For example, startup of the head mounted display 100, in other words, detection of power-on may be set as the start trigger. For example, a processing start request from the OS 150 or a specific application may be set as a start trigger. When the display switching processing is invoked from the specific application and executed, the display switching processing operates as a subroutine of the specific application.

In the display switching processing, the display switching unit 144 checks an operation mode stored in the operation mode 122 of the storing unit 120 (step S102). When the operation mode is a "close-at-hand work mode", the display switching unit 144 transitions the processing to step S110. When the operation mode is an "on-the-spot broadcasting mode", the display switching unit 144 transitions the processing to step S120 (step S104).

When the operation modes is the close-at-hand work mode (step S104: close-at-hand work), the display switching unit 144 causes the detecting unit 142 to detect a visual line direction of the user (step S110).

A-2-1. Detection of a Visual Line Direction

Figure 5A:
FIGS. 5A to 5C are explanatory diagrams for explaining a visual line direction of the user.
Figure 5B:
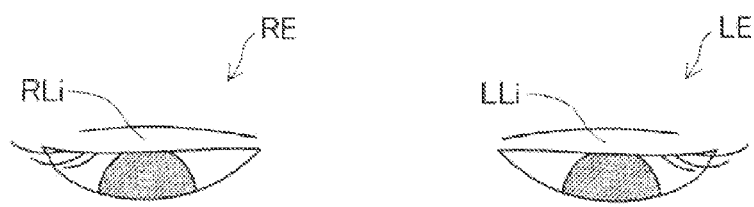
Figure 5C:
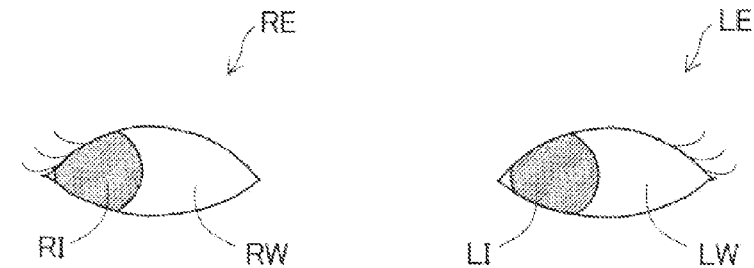

FIGS. 5A to 5C are explanatory diagrams for explaining a visual line direction of the user. FIG. 5A shows a state of the right eye RE and the left eye LE of the user at the time when the visual line direction is the forward direction. As shown in the figure, when the visual line of the user is directed to a substantially forward direction, in other words, forward, an iris RI of the right eye RE is located substantially in the center of the right eye RE. The same holds true concerning an iris LI of the left eye LE. Note that the forward direction in FIG. 5A is equivalent to a "first direction" in the appended claims.

FIG. 5B shows a state of the right eye RE and the left eye LE of the user at the time when the visual line direction is the vertical direction. As shown in the figure, when the visual line of the user is directed to a substantially vertical direction, in other words, downward, an eyelid RLi of the right eye RE droops and hangs over the center of the right eye RE. The same holds true concerning an eyelid LLi of the left eye LE. Note that the vertical direction in FIG. 5B is equivalent to a "second direction" in the appended claims.

FIG. 5C shows a state of the right eye RE and the left eye LE of the user at the time when the visual line direction is a sideward direction. As shown in the figure, when the visual line of the user is directed to a substantially sideward direction, in other words, sideward, the iris RI of the right eye RE is located at an end of the right eye RE and a white of eye RW is located in the center of the right eye RE. The same holds true concerning the iris LI of the left eye LE.

Note that the visual line directions (the forward direction, the vertical direction, and the sideward direction) of the user explained above means rough directions to which the visual line of the user is directed. Slight deviation of the visual line is allowed.

Figure 6A:
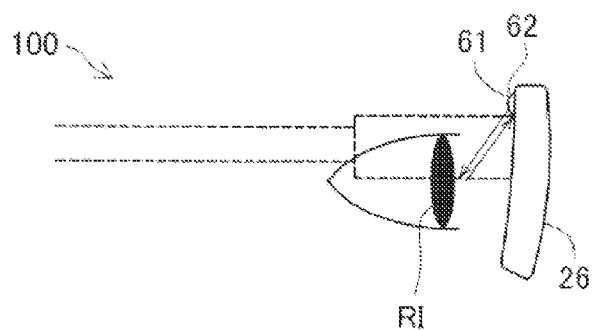
FIGS. 6A and 6B are explanatory diagrams for explaining a detection method for the visual line direction.
Figure 6B:
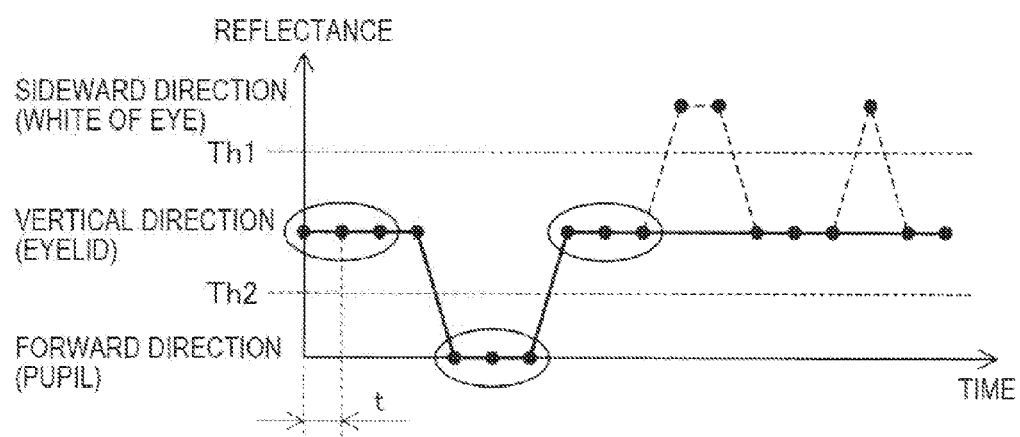

FIGS. 6A and 6B are explanatory diagrams for explaining a method of detecting a visual line direction. FIG. 6A is an explanatory diagram for explaining the light emitting unit 61 and the light receiving unit 62. In FIG. 6A, an overview of the right eye RE of the user wearing the head mounted display 100 viewed from a side is shown. The light emitting unit 61 and the light receiving unit 62 are arranged on the inner side of the image display unit 20 and in a position opposed to the middle of the forehead of the user when the user wears the image display unit 20. The light emitting unit 61 emits an infrared ray, which is invisible light, toward the center of the right eye RE and the center of the left eye LE of the user. The infrared ray emitted from the light emitting unit 61 is reflected on the right eye RE and the left eye LE of the user. The light receiving unit 62 receives reflected light reflected by the right eye RE and the left eye LE of the user and transmits an output signal corresponding to the magnitude of the received infrared ray to the detecting unit 142.

FIG. 6B is an explanatory diagram for explaining a state in which the detecting unit 142 detects a visual line direction of the user on the basis of the output signal transmitted from the light receiving unit 62. The reflectance of the infrared ray on the right eye RE and the left eye LE of the user is different when the infrared ray hits the iris (the pupil), when the infrared ray hits the eyelid, and when the infrared ray hits the white of eye. Specifically, the reflectance of the infrared ray is the lowest when the infrared ray hits the iris and increases in the order of the eyelid and the white of eye. Therefore, a detection value indicated by the output signal transmitted from the light receiving unit 62 increases in the order of the iris, the eyelid, and the white of eye.

Therefore, when the detection value of the output signal transmitted from the light receiving unit 62 is equal to or larger than a first threshold Th1, the detecting unit 142 determines that the infrared ray hits the white of eye. Similarly, when the detection value indicated by the output signal transmitted from the light receiving unit 62 is smaller than the first threshold Th1 and larger than a second threshold Th2, the detecting unit 142 determines that the infrared ray hits the eyelid. Similarly, when the detection value indicated by the output signal transmitted from the light receiving unit 62 is equal to or smaller than the second threshold Th2, the detecting unit 142 determines that the infrared ray hits the iris (the pupil).

The detecting unit 142 performs the determination at every time interval t for receiving the output signal transmitted from the light receiving unit 62. When the same state continues three times or more, the detecting unit 142 detects the state as a visual line direction of the user. That is, when the detecting unit 142 determines continuously three times or more that the infrared ray hits the white of eye, the visual line direction of the user detected by the detecting unit 142 is the "sideward direction". Similarly, when the detecting unit 142 determines continuously three times or more that the infrared ray hits the eyelid, the visual line direction of the user detected by the detecting unit 142 is the "vertical direction". Similarly, when the detecting unit 142 determines continuously three times or more that the infrared ray hits the iris, the visual line direction of the user detected by the detecting unit 142 is the "forward direction".

In the example shown in FIG. 6B, the detecting unit 142 detects that the visual line direction of the user changes in the order of the eyelid, the iris (the pupil), and the eyelid. Note that portions indicated by broken lines in FIG. 6B (where it is determined that the infrared ray hits the white of eye) are neglected.

In step S112 in FIG. 4, the display switching unit 144 determines whether the visual line direction of the user is the vertical direction. When the visual line direction of the user is not the vertical direction (step S112: NO), in other words, when the visual line direction is the sideward direction or the forward direction, the display switching unit 144 switches the display of the virtual image by the image display unit 20 to the virtual image preferential display (step S114). Thereafter, the display switching unit 144 transitions the processing to step S110. On the other hand, when the visual line direction of the user is the vertical direction (step S112: YES), the display switching unit 144 switches the display of the virtual image by the image display unit 20 to the outside scene preferential display (step S116). Thereafter, the display switching unit 144 transitions the processing to step S110.

A-2-2. Virtual Image Preferential Display and Outside Scene Preferential Display In this embodiment, the "virtual image preferential display" means that the virtual image VI (FIG. 3) is preferentially displayed by improving visibility of the virtual image VI compared with the outside scene SC during the display of the virtual image VI. The "outside scene preferential display" means that the outside scene SC is preferentially displayed by improving visibility of the outside scene SC compared with the virtual image VI during the display of the virtual image VI.

Figure 7A:
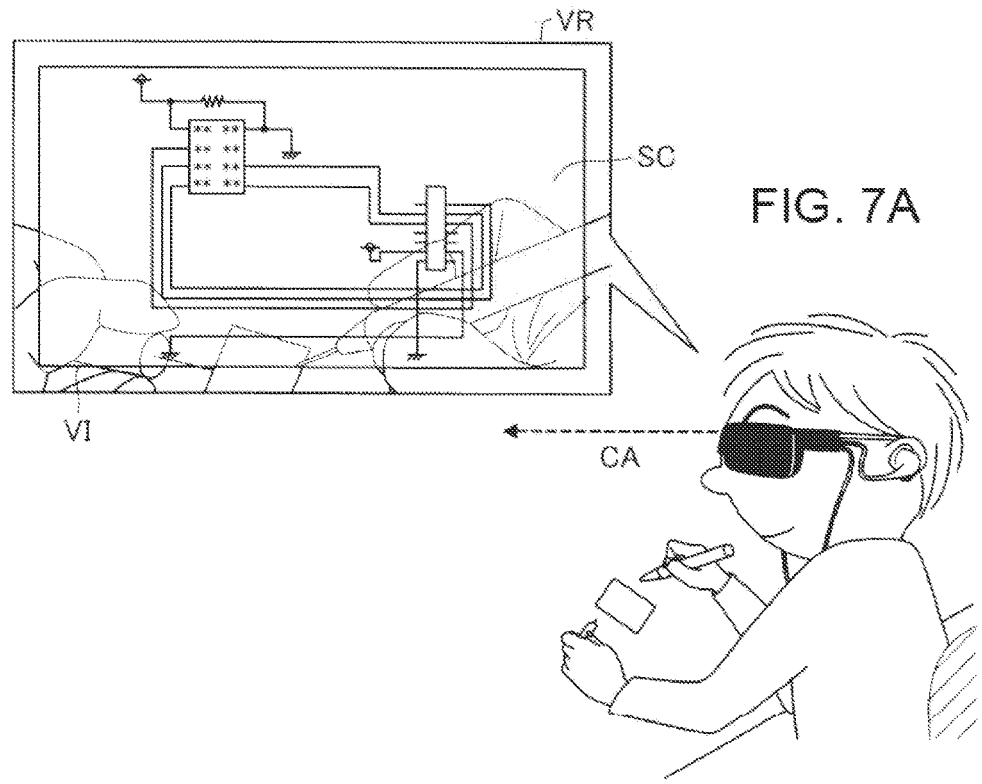
FIGS. 7A and 7B are explanatory diagrams for explaining virtual image preferential display and outside scene preferential display in a close-at-hand work mode.
Figure 7B:
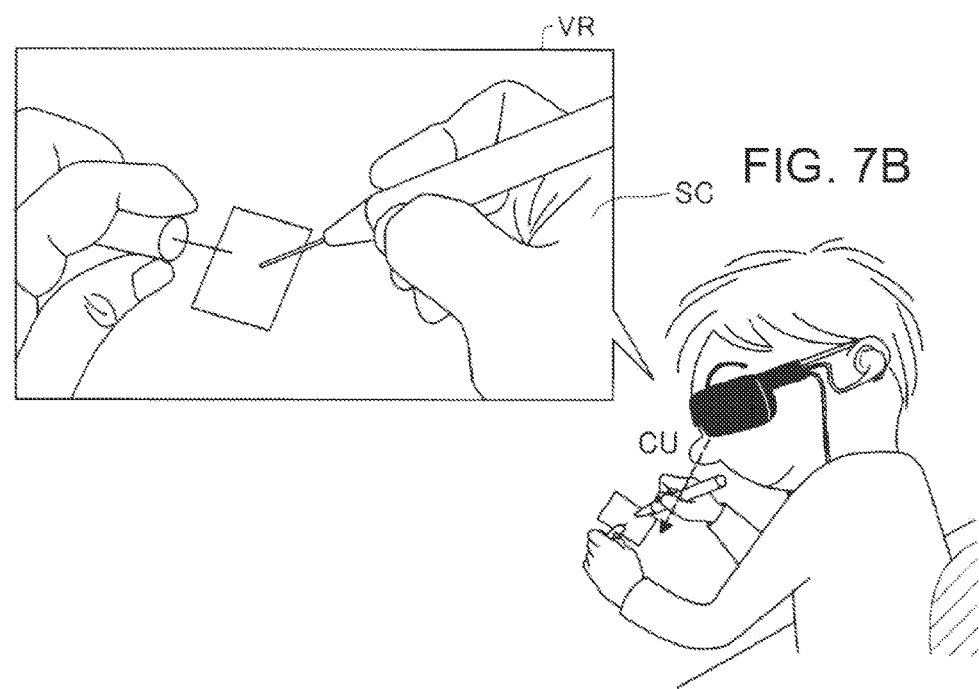

FIGS. 7A and 7B are explanatory diagrams for explaining the virtual image preferential display and the outside scene preferential display in the close-at-hand work mode. FIG. 7A shows a state of the virtual image preferential display in the close-at-hand work mode. In the virtual image preferential display, as in FIG. 3, the virtual image VI is displayed in a wide region from the center to the vicinity of the end of the visual field VR of the user. Therefore, the user can clearly visually recognize the virtual image VI in the visual field VR. In an example shown in FIG. 7A, a circuit diagram, which is a diagram for assisting work (soldering) of the user, is displayed. Note that, in the case of the virtual image preferential display, the display switching unit 144 does not cause the image processing unit 160 and the display control unit 190 to perform any processing.

FIG. 7B shows a state of the outside scene preferential display in the close-at-hand work mode. In the outside scene preferential display, the virtual image VI is not displayed. Specifically, the display switching unit 144 transmits a request for not displaying the virtual image VI to the display control unit 190. The display control unit 190 receives the request and turns off control signals to the right display driving unit 22 and the left display driving unit 24 to stop the generation of image light. As a result, the user can clearly visually recognize the outside scene SC through the optical-image display unit (the right optical-image display unit 26 and the left optical-image display unit 28) in the visual field VR.

As explained above, in the close-at-hand work mode (the first operation mode), when the visual line direction of the user is the forward direction (the first direction), the display switching unit 144 switches the display of the virtual image to the virtual image preferential display. When the visual line direction of the user is the vertical direction (the second direction), the display switching unit 144 switches the display of the virtual image to the outside scene preferential display. Therefore, it is possible to cause the user to visually recognize the virtual image VI when the user directs the visual line forward and improve the visibility of the outside scene SC when the user directs the visual line downward. Therefore, the close-at-hand work mode is suitable for "a scene in which the user performs work while directing the visual line downward" such as assembly work, manufacturing work, writing work, and a surgical operation.

When the operation mode is the on-the-spot broadcasting mode in step S104 in FIG. 4 (step S104: on-the-spot broadcasting), the display switching unit 144 causes the detecting unit 142 to detect a visual line direction of the user (step S120). Details are the same as step S110. Thereafter, in step S122, the display switching unit 144 determines whether the visual line direction of the user is the forward direction. When the visual line direction of the user is not the forward direction (step S122: NO), in other words, when the visual line direction is the sideward direction or the vertical direction, the display switching unit 144 switches the display of the virtual image by the image display unit 20 to the virtual image preferential display (step S124). Thereafter, the display switching unit 144 transitions the processing to step S120. On the other hand, when the visual line direction of the user is the forward direction (step S122: YES), the display switching unit 144 switches the display of the virtual image by the image display unit 20 to the outside scene preferential display (step S126). Thereafter, the display switching unit 144 transitions the processing to step S120.

Figure 8A:
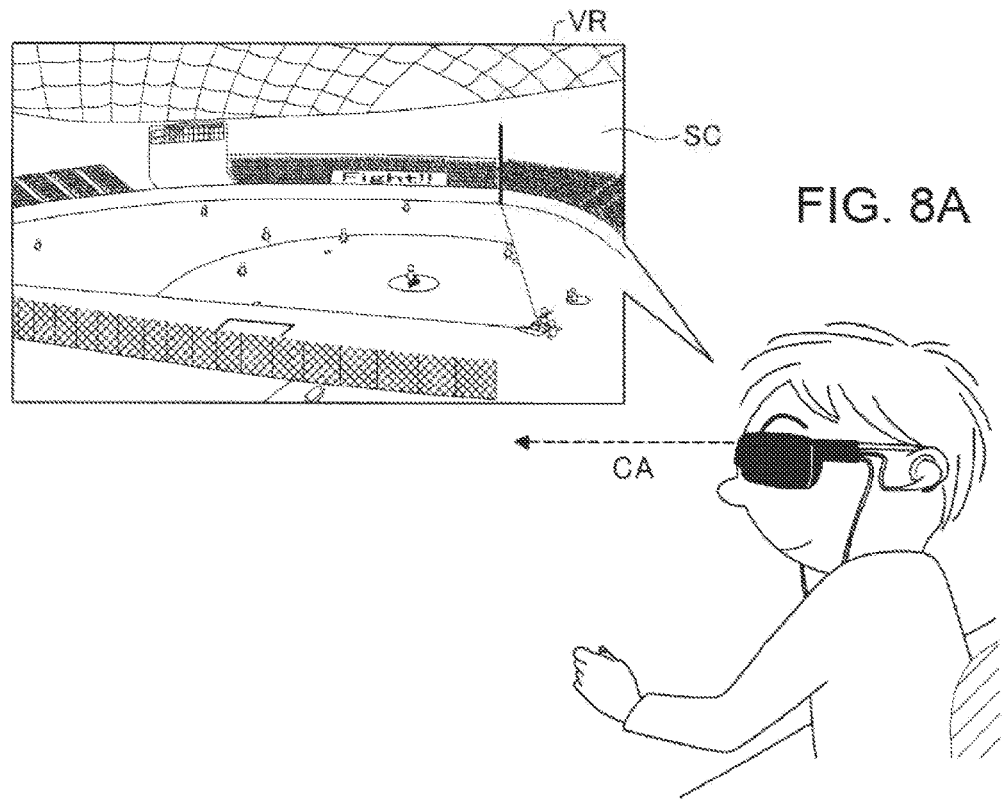
FIGS. 8A and 8B are explanatory diagrams for explaining the virtual image preferential display and the outside scene preferential display in an on-the-spot broadcasting mode.
Figure 8B:
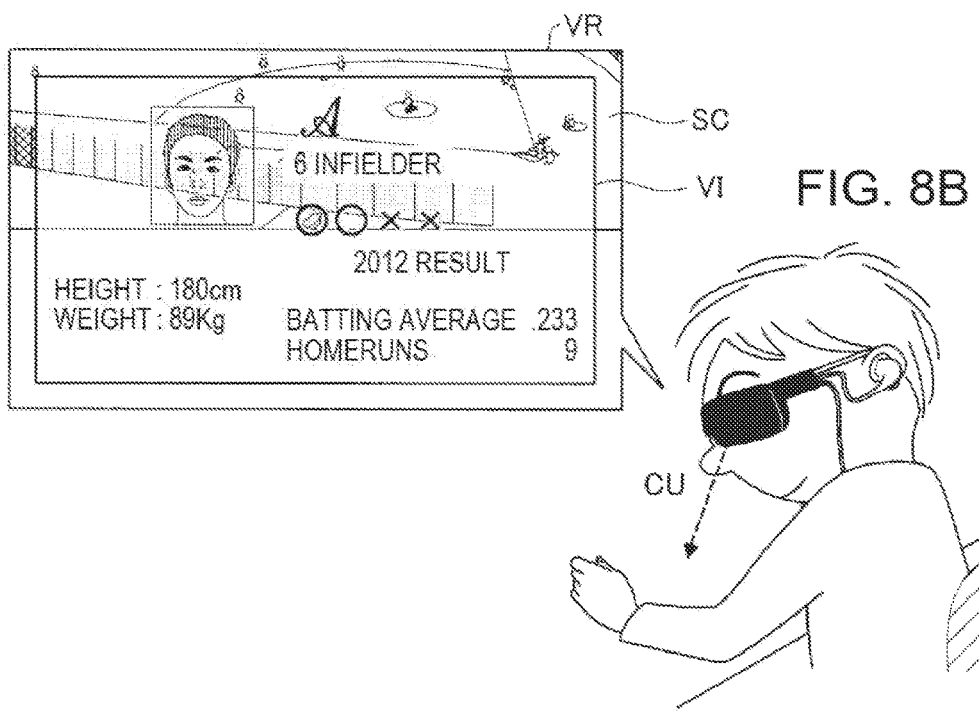

FIGS. 8A and 8B are explanatory diagram for explaining the virtual image preferential display and the outside scene preferential display in the on-the-spot broadcasting mode. FIG. 8A shows a state of the outside scene preferential display in the on-the-spot broadcasting mode. As in the close-at-hand work mode, in the outside scene preferential display, the virtual image VI is not displayed. Details are as explained with reference to FIG. 7B. FIG. 8B shows a state of the virtual image preferential display in the case of the on-the-spot broadcasting mode. As in the close-at-hand work mode, in the virtual image preferential display, the virtual image VI is displayed in a wide region from the center to the vicinity of the end of the visual field VR of the user. Details are as explained with reference to FIG. 7A.

As explained above, in the on-the-spot broadcasting mode (the second operation mode), the display switching unit 144 switches the display of the virtual image to the outside scene preferential display when the visual line direction is the forward direction (the first direction) and switches the display of the virtual image to the virtual image preferential display when the visual line direction is the vertical direction (the second direction). Therefore, it is possible to improve the visibility of the outside scene SC when the user directs the visual line forward and cause the user to visually recognize the virtual image VI when the user directs the visual line downward. Therefore, the on-the-spot broadcasting mode is suitable for "a scene in which the user performs work while directing the visual line forward" such as live coverage of sports and the like, leading a meeting, reading news, dubbing work, and driving.

A-2-3. Variation of the Virtual Image Preferential Display

Figure 9A:
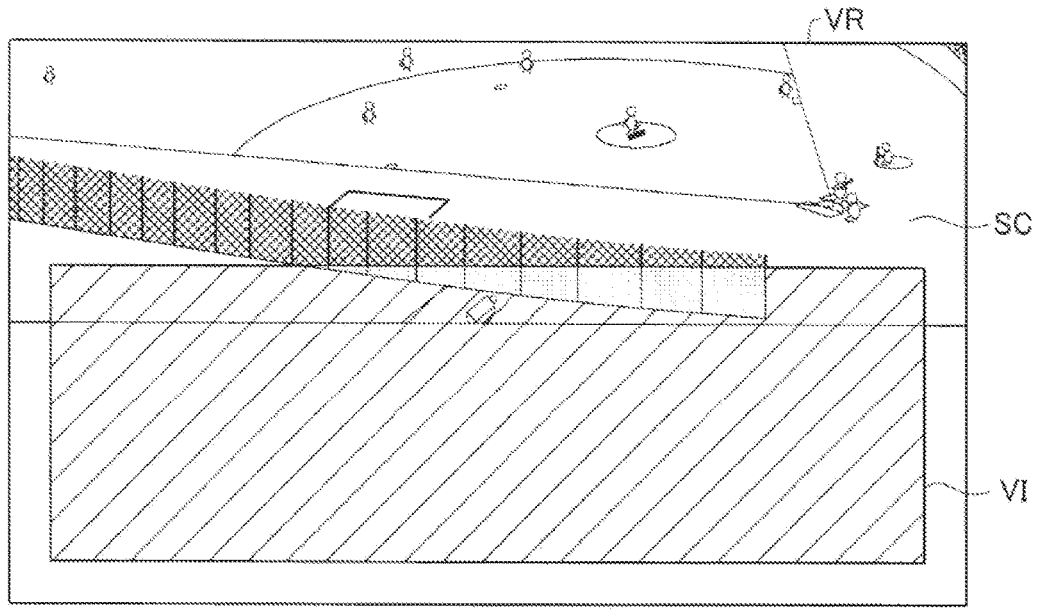
FIGS. 9A and 9B are explanatory diagrams showing a variation of the virtual image preferential display.
Figure 9B:
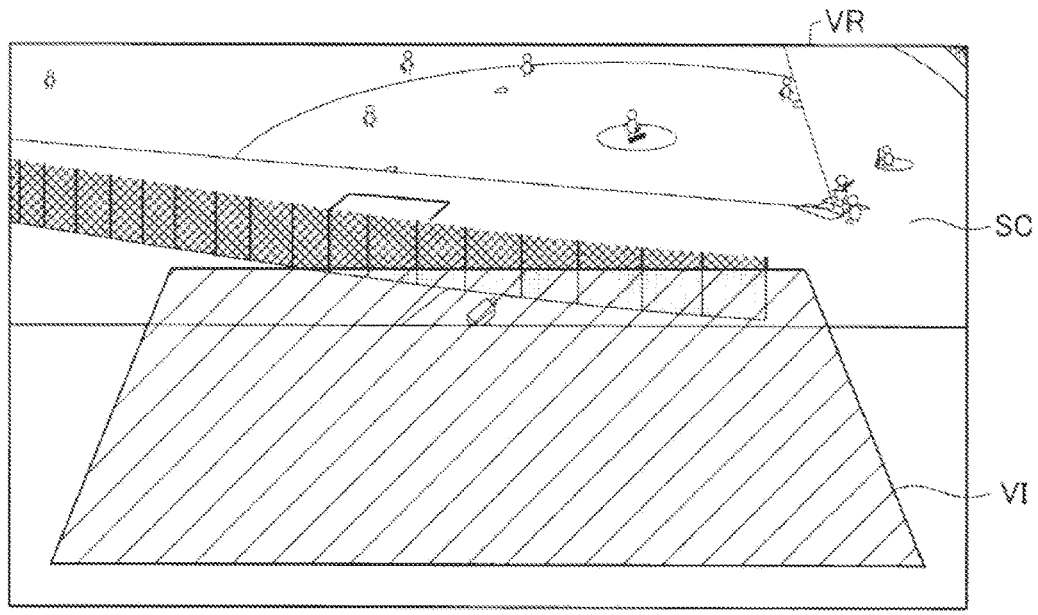

FIGS. 9A and 9B are explanatory diagrams showing a variation of the virtual image preferential display. FIG. 9A shows an example of the variation. In the virtual image preferential display explained with reference to FIGS. 7A and 8B, the virtual image VI is displayed in the wide region from the center to the vicinity of the end of the visual field VR of the user. However, in the virtual image preferential display, the display switching unit 144 may display the virtual image VI that occupies at least a part of the visual field VR of the user. For example, the display switching unit 144 can virtually divide the visual field VR of the user into left and right regions or upper and lower regions and display the virtual image VI in one of the divided regions. In this case, for example, the display switching unit 144 may designate, to the image processing unit 160, a region where the virtual image VI is displayed. The image processing unit 160 receives the designation of the region, generates image data obtained by combining an image displayed as the virtual image VI and dummy black data, and transmits the generated image data to the image display unit 20 as the image data for right eye Data1 and the image data for left eye Data2. The display switching unit 144 may generate image data obtained by combining the image displayed as the virtual image VI and the dummy black data and transmit the generated image data to the image processing unit 160. The image processing unit 160 receives the image data and transmits the received image data to the image display unit 20 as the image data for right eye Data1 and the image data for left eye Data2.

In the example shown in FIG. 9A, the visual field VR of the user is divided into upper and lower regions and the virtual image VI is displayed in the lower region (see a shaded region). A form for dividing the visual field VR of the user into upper and lower regions and displaying the virtual image VI in the lower region in this way is suitable for the on-the-spot broadcasting mode in the sense that the virtual image VI is displayed away from the visual line direction in which the visual field of the user is desired to be secured. Because of the same region, in the close-at-hand work mode, a form for dividing the visual field VR of the user into upper and lower regions and displaying the virtual image VI in the upper region is suitable.

FIG. 9B shows another example of the variation. As indicated by a shaded region in FIG. 9B, the display switching unit 144 may display the virtual image VI with the width on the lower side increased and the width on the upper side reduced such that the user feels a sense of depth.

Besides, as the virtual image preferential display, for example, various forms explained below can be adopted.

In order to highlight the display of the virtual image VI, color conversion processing is applied to image data. Specifically, for example, a camera configured to pick up an image of an outside scene (a scene on the outside) in the visual field direction of the user and acquire an outside scene image is provided in the image display unit 20. The display switching unit 144 applies, to image data, color conversion processing for intensifying a complementary color of the outside scene image acquired by the camera.

In order to highlight the display of the virtual image VI, processing is applied to image data. Specifically, for example, the display switching unit 144 thickens lines and bordering of an image included in image data.

In order to highlight the display of the virtual image VI, a blinking operation of a backlight is stopped. The blinking operation of the backlight is an operation for extinguishing the backlight at the time of switching from a certain image to the next image and reducing an afterglow. In this case, the display switching unit 144 transmits a stop instruction for the blinking operation to the right backlight control unit 201 and the left backlight control unit 202.

In order to highlight the display of the virtual image VI, a color rendering property or a color temperature of the backlight is increased. In this case, the right backlight 221 and the left backlight 222 include a structure in which the color rendering property and the color temperature are variable.

In order to highlight the display of the virtual image VI, the transmittance of external light in the dimming plate arranged on the front side of the image display unit 20 is reduced.

A-2-4. Variation of the Outside Scene Preferential Display

In the outside scene preferential display explained with reference to FIGS. 7B and 8A, the virtual image VI is not displayed. However, in the outside scene preferential display, the display switching unit 144 may reduce the display size of the virtual image VI, thin the display of the virtual image VI, and set a display place of the virtual image VI in the vicinity of the end of the visual field VR of the user. For example, the display switching unit 144 can reduce the size of the virtual image VI in the visual field VR of the user to nearly the size of an icon in an entire screen of a personal computer. In this case, the display switching unit 144 may designate, to the image processing unit 160, a region where the virtual image VI Is displayed. Details are the same as the details in "A-2-3. Variation of the virtual image preferential display". The display switching unit 144 may generate image data obtained by combining an image having the icon size displayed as the virtual image VI and dummy black data and transmit the generated image data to the image processing unit 160. Details are the same as the details in "A-2-3. Variation of the virtual image preferential display". If the display size of the virtual image VI is reduced in this way, the display switching unit 144 can improve the visibility of the outside scene SC in other portions where the virtual image VI is not displayed. Since the user can visually recognize the small virtual image VI, the user can recognize the presence of the virtual image even while the outside scene preferential display is performed.

For example, the display switching unit 144 can thin the display of the virtual image VI. In this case, the display control unit 190 of the control unit 10 transmits, to the right backlight control unit 201, a control signal for designating the luminance of the right backlight 221 together with a control signal for designating ON/OFF of driving of the right backlight 221. The same holds true concerning the left backlight control unit 202. As the control signal for designating the luminance of the backlight, for example, a PWM (Pulse Width Modulation) signal can be used. The display switching unit 144 transmits a request for thinning the display of the virtual image VI to the display control unit 190. The display control unit 190 receives the request and transmits a control signal (a PWM signal) for reducing the luminance of the right backlight 221 and the left backlight 222 to the right backlight control unit 201 and the left backlight control unit 202. If illumination light by the right backlight 221 and the left backlight 222 darkens, image light emitted by the image-light generating unit weakens. Therefore, the virtual image VI displayed in the visual field VR of the user is displayed in a thinned and blurred state. If the display of the virtual image VI is thinned in this way, it is possible to improve the visibility of the outside scene SC visually recognized by the user through the virtual image VI. Since the user can visually recognize the thinly displayed virtual image VI, the user can recognize the presence of the virtual image even while the outside scene preferential display is performed.

In the above explanation, the display control unit 190 may reduce a duty ratio of the PWM signal transmitted to the right backlight control unit 201 and the left backlight control unit 202 stepwise as time elapses. A reduction range, a reduction time, and the like of the duty ratio can be set arbitrarily. The duty ratio of the PWM signal is reduced stepwise, whereby illumination light by the right backlight 221 and the left backlight 222 darkens (decreases) stepwise. Consequently, the virtual image VI displayed in the visual field VR of the user gradually changes to a thin and blurred display.

Besides, as the outside scene preferential display, for example, various forms explained below can be adopted.

In order to make the virtual image VI less conspicuous, color conversion processing is applied to image data. Specifically, for example, the display switching unit 144 applies color conversion processing for changing a color to a protective color of an outside scene image acquired by the camera to image data.

In order to make the virtual image VI less conspicuous, processing is applied to image data. Specifically, for example, the display switching unit 144 thins lines and bordering of an image included in image data.

In order to make the virtual image VI less conspicuous, a color rendering property or a color temperature of the backlight is reduced. In this case, the right backlight 221 and the left backlight 222 include a structure in which the color rendering property and the color temperature are variable.

In order to make the virtual image VI less conspicuous, the transmittance of external light in the dimming plate arranged on the front side of the image display unit 20 is increased.

The intensity of image light and the intensity of external light are related to the visibility of the virtual image VI. Therefore, the virtual image preferential display and the outside scene preferential display may be switched by adjusting the intensity of the image light with reference to the intensity of the external light.

As explained above, according to the first embodiment, an object that the user intends to see, that is, the intention of the user is reflected on the visual line direction of the user detected by the detecting unit 142. The display switching unit 144 switches, according to the visual line direction detected by the detecting unit 142, the display of the virtual image VI by the image display unit 20 between the outside scene preferential display for preferentially displaying the outside scene SC and improving the visibility of the outside scene SC and the virtual image preferential display for preferentially displaying the virtual image VI. As a result, in the head mounted display 100 (the head-mounted-display device), it is possible to improve the visibility of the outside scene SC according to the intention of the user.

Further, the display switching unit 144 includes the plurality of operation modes (the close-at-hand work mode serving as the first operation mode and the on-the-spot broadcasting mode serving as the second operation mode) in which visual line directions for improving the visibility of the outside scene SC are different. Therefore, the user can cause the display switching unit 144 to operate in an operation mode corresponding to the preference of the user. As a result, it is possible to improve the convenience of use of the head mounted display 100 (the head-mounted-display device) for the user.

A-3. Additional Processing in the Display Switching Processing

In the procedure management processing (FIG. 4), additional processing 1 and additional processing 2 explained below may be performed. The additional processing 1 and the additional processing 2 may be independently added or may be added in combination.

A-3-1. Additional Processing 1

Figure 10:
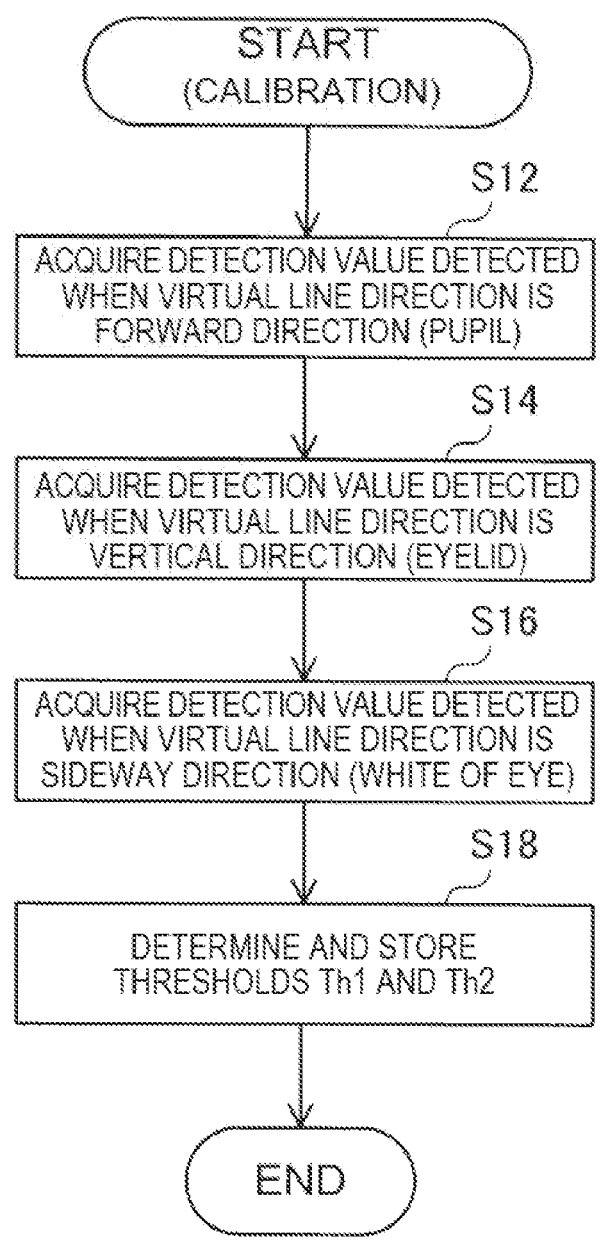
FIG. 10 is a flowchart for explaining a procedure of additional processing 1.

FIG. 10 is a flowchart for explaining a procedure of the additional processing 1. In the additional processing 1, detection processing for a visual line direction of the user by the detecting unit 142 is calibrated according to characteristics of the eyes of the user, characteristics of motions of the eyes of the user, an environment of use of the head mounted display 100, and the like.

The detecting unit 142 acquires a detection value detected when the visual line direction of the user is the forward direction (step S12). Specifically, the detecting unit 142 causes the image display unit 20 to display the virtual image VI including a message such as "Please look straight forward". The detecting unit 142 causes the light emitting unit 61 to emit an infrared ray and receives an output signal transmitted from the light receiving unit 62. The output signal received in step S12 is a detection value detected by the light receiving unit 62 when the infrared ray hits the pupil. Subsequently, the detecting unit 142 acquires a detection value detected when the visual line direction of the user is the vertical direction (step S14). Specifically, the detecting unit 142 causes the image display unit 20 to display the virtual image VI including a message such as "Please turn your eyes downward while keeping the face straight forward". The detecting unit 142 causes the light emitting unit 61 to emit an infrared ray and receives an output signal transmitted from the light receiving unit 62. The output signal received in step S14 is a detection value detected by the light receiving unit 62 when the infrared ray hits the eyelid. Subsequently, the detecting unit 142 acquires a detection value detected when the visual line direction of the user is the vertical direction (step S16). Specifically, the detecting unit 142 causes the image display unit 20 to display the virtual image VI including a message such as "Please turn your eyes sideward while keeping the face straight forward". The detecting unit 142 causes the light emitting unit 61 to emit an infrared ray and receives an output signal transmitted from the light receiving unit 62. The output signal received in step S16 is a detection value detected by the light receiving unit 62 when the infrared ray hits the white of eye.

The detecting unit 142 determines, on the basis of the detection values acquired in steps S12, S14, and S16, the thresholds Th1 and Th2 used in the detection processing for a visual line direction of the user and causes the storing unit 120 to store the thresholds Th1 and Th2 (step S18). For example, the thresholds Th1 and Th2 can be determined as follows.

$Th1 =$ (detection value acquired in step $S14$ + detection value acquired in step $S16$)/2

$Th2 =$ (detection value acquired in step $S12$ + detection value acquired in step $S14$)/2

As explained above, according to the additional processing 1, the detecting unit 142 acquires the detection value detected by the light receiving unit 62 when the visual line direction of the user is the forward direction, the detection value detected by the light receiving unit 62 when the visual line direction of the user is the vertical direction, and the detection value detected by the light receiving unit 62 when the visual line direction of the user is the sideward direction and determines, on the basis of the acquired detection values, the thresholds Th1 and Th2 used in the detection processing for a visual line direction of the user. Consequently, the detecting unit 142 can determine the thresholds Th1 and Th2 taking into accounts various conditions such as characteristics of the eyes (e.g., the size of the eye, the color and the size of the iris, and the color and the size of the pupil) of the user who actually uses the head mounted display 100, characteristics of motions of the eye (e.g., a habit of away of motion and a motion amount), and an environment of use of the head mounted display 100 (e.g., the ambient brightness) and calibrate the detection processing for a visual line direction of the user by the detecting unit 142.

A-3-2. Additional Processing 2

In the additional processing 2, in addition to the switching of the outside scene preferential display and the virtual image preferential display corresponding to the visual line direction of the user, the display switching unit 144 switches the outside scene preferential display and the virtual image preferential display on the basis of at least one of a change in the present position coordinate and the motion of the head of the user. Specifically, for example, when the present position coordinate changes a predetermined amount or more, the display switching unit 144 switches the virtual image preferential display to the outside scene preferential display. The display switching unit 144 acquires the present position coordinate of the user according to position information of the control unit 10 detected by the GPS module 134. Consequently, the display switching unit 144 can estimate that the user is moving and improve the visibility of the outside scene SC. For example, when the motion of the head of the user is equal to or larger than a predetermined amount, the display switching unit 144 switches the virtual image preferential display to the outside scene preferential display. The display switching unit 144 acquires the motion of the head of the user according to motion information detected by the nine-axis sensor 66. Consequently, the display switching unit 144 can estimate that the user has directed the user's attention to something else by turning around or looking up and improve the visibility of the outside scene SC.

B. Second Embodiment

In a second embodiment of the invention, a configuration capable of changing detection sensitivity for a visual line direction of the user by a detecting unit according to a state of use of a head-mounted display device is explained. In the following explanation, only components including configurations and operations different from those in the first embodiment are explained. Note that, in the figures, components same as those in the first embodiment are denoted by reference numerals and signs same as those in the first embodiment explained above. Detailed explanation of the components is omitted.

B-1. Configuration of the Head-Mounted Display Device

Figure 11:
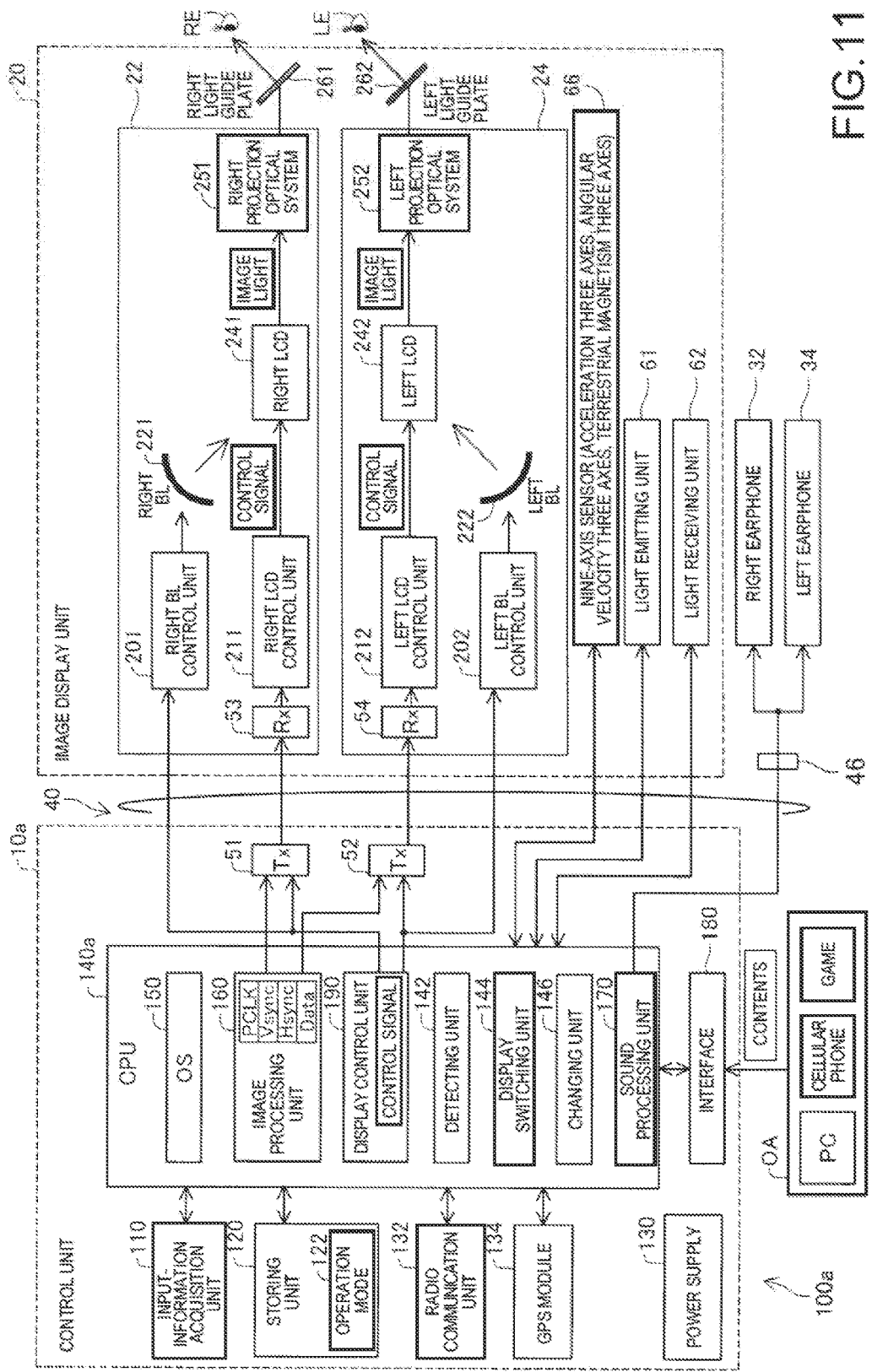
FIG. 11 is a block diagram functionally showing the configuration of a head mounted display in a second embodiment.

FIG. 11 is a block diagram functionally showing the configuration of a head mounted display 100a in the second embodiment. The head mounted display 100a is different from the head mounted display 100 in the first embodiment shown in FIG. 2 in that the head mounted display 100a includes a control unit 10a instead of the control unit 10. The control unit 10a includes a CPU 140a instead of the CPU 140. The CPU 140a includes a changing unit 146 in addition to the processing units explained in the first embodiment. The changing unit 146 executes state estimation processing.

B-2. Display Switching Processing

Display switching processing in the second embodiment is the same as the display switching processing in the first embodiment.

B-3. Additional Processing in the Display Switching Processing

Additional processing in the second embodiment is the same as the additional processing in the first embodiment.

B-4. State Estimation Processing

Figure 12:
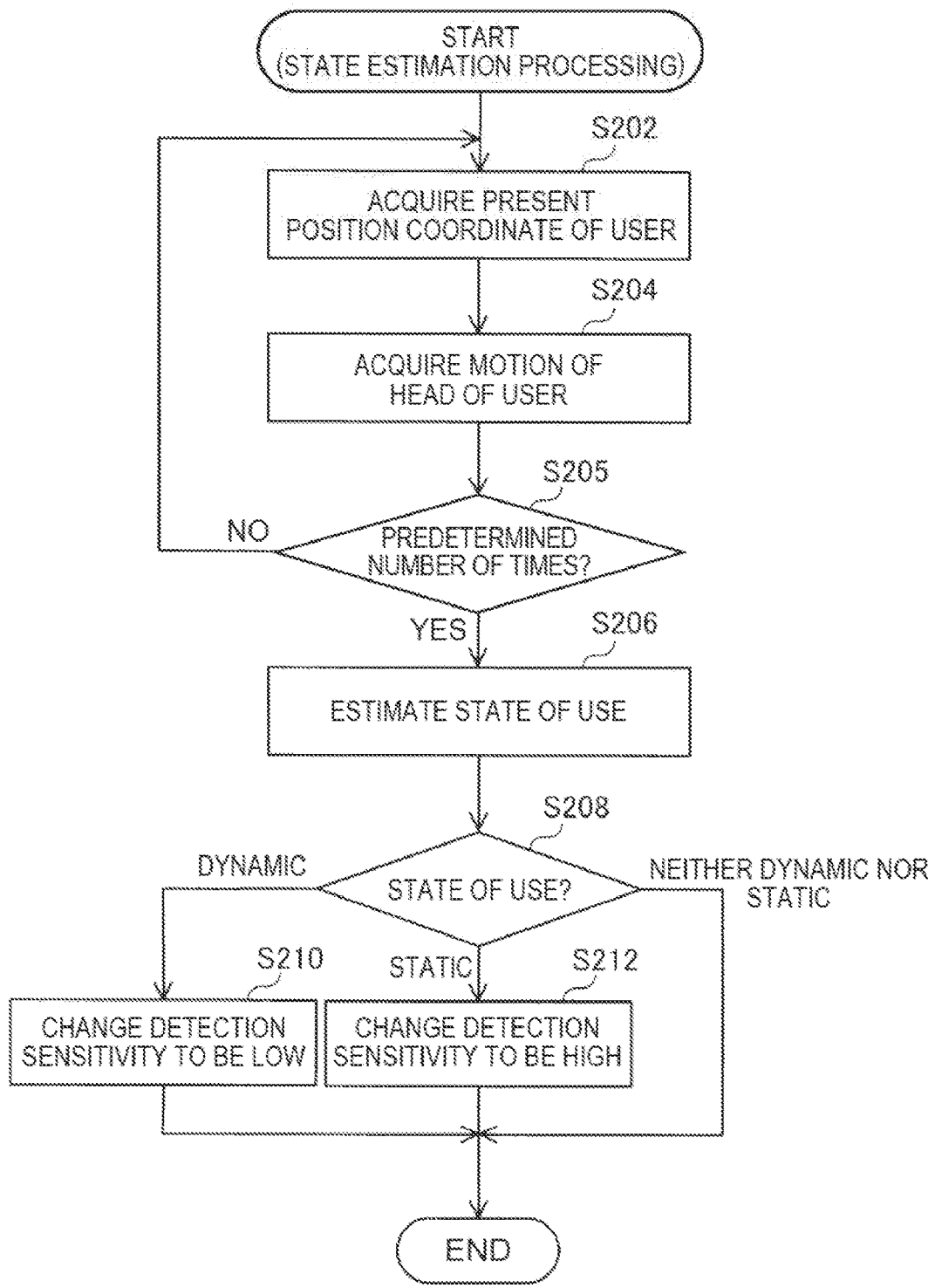
FIG. 12 is a flowchart for explaining a procedure of state estimation processing.

FIG. 12 is a flowchart for explaining a procedure of state estimation processing. The state estimation processing is processing for estimating a state of use of the head mounted display 100a and changing detection sensitivity for a visual line direction by the detecting unit 142 according to an estimation result. The state estimation processing may be executed as initial setting before the display switching processing (FIG. 4) is executed or may be executed in parallel to the display switching processing. When the state estimation processing is executed before the display switching processing, it is possible to adjust, according to the processing, detection sensitivity for a visual line direction in steps S110 and S120 of the display switching processing. When the state estimation processing is executed in parallel to the display switching processing, it is possible to dynamically change, according to the processing, detection sensitivity for a visual line direction in steps S110 and S120 of the display switching processing.

First, the changing unit 146 acquires the present position coordinate of the user (step S202). Specifically, the changing unit 146 acquires position information of the control unit 10 detected by the GPS module 134 and causes the storing unit 120 to store the acquired position coordinate. The changing unit 146 acquires a motion of the head of the user (step S204). Specifically, the changing unit 146 acquires motion information detected by the nine-axis sensor 66 and causes the storing unit 120 to store the acquired motion information. The changing unit 146 determines whether the storing unit 120 has stored the present position coordinate and the motion of the head of the user a predetermined number of times or more (step S205). The predetermined number of times can be arbitrarily set. When the storing unit 120 has stored the present position coordinate and the motion of the head less than the predetermined number of times (step S205: NO), the changing unit 146 transitions the processing to step S202 and continues to acquire the present position coordinate and the motion of the head.

When the storing unit 120 has stored the present position coordinate and the motion of the head the predetermined number of times or more (step S205: YES), the changing unit 146 estimates a state of use of the head mounted display 100a (step S206). Specifically, for example, the changing unit 146 can estimate the state of use according to procedures "a" to "e" explained below.

(a) The changing unit 146 compares an nth stored motion of the head and an n+1th stored motion of the head among motions of the head stored in the storing unit 120. When the changing unit 146 detects a predetermined number of times (three times) or more that an amount of change between the motions of the head is equal to or larger than a third threshold Th3, the changing unit 146 estimates that the state of use of the head mounted display 100a is "dynamic".

(b) Similarly, the changing unit 146 compares the nth stored motion of the head and the n+1th stored motion of the head among the motions of the head stored in the storing unit 120. When the changing unit 146 detects a predetermined number of times (three times) or more that an amount of change between the motions of the head is equal to or larger than a fourth threshold Th4, the changing unit 146 estimates that the state of use of the head mounted display 100a is "static".

(c) The changing unit 146 compares an nth stored present position and an n+1th stored present position among the present positions stored in the storing unit 120. When the changing unit 146 detects a predetermined number of times (three times) or more that an amount of change between the present positions is equal to or larger than a fifth threshold Th5, the changing unit 146 estimates that the state of use of the head mounted display 100a is "dynamic".

(d) Similarly, the changing unit 146 compares the nth stored present position and the n+1th stored present position among the present positions stored in the storing unit 120. When the changing unit 146 detects a predetermined number of times (three times) or more that an amount of change between the present positions is equal to or larger than a sixth threshold Th6, the changing unit 146 estimates that the state of use of the head mounted display 100*a* is "static".

(e) When the state of use corresponds to none of (a) to (d) above, the changing unit 146 estimates that the state of use of the head mounted display 100*a* is "neither dynamic nor static". Note that the predetermined thresholds Th3 to Th6 can be arbitrarily set. The same holds true concerning the predetermined number of times.

In step S208 in FIG. 12, the changing unit 146 divides the processing according to an estimation result in step S206. When the state of use is estimated as "dynamic" (step S208: dynamic), the changing unit 146 changes the detection sensitivity for a visual line direction by the detecting unit 142 to be low (step S210). Specifically, the changing unit 146 transmits a request for reducing the detection sensitivity to the detecting unit 142. After the end of step S210, the changing unit 146 ends the processing. In this way, in the dynamic state of use in which the body, the head, and the visual line of the user rapidly change, the changing unit 146 changes the sensitivity of detection by the detecting unit 142 to be low. Therefore, it is possible to suppress an excessive change in a visual line direction detected by the detecting unit 142.

When the state of use is estimated as "static" (step S208: static), the changing unit 146 changes the detection sensitivity for a visual line direction by the detecting unit 142 to be high (step S212). Specifically, the changing unit 146 transmits a request for increasing the detection sensitivity to the detecting unit 142. After the end of step S212, the changing unit 146 ends the processing. In this way, in the static state of use in which the body, the head, and the visual line of the user do not change so much, the changing unit 146 changes the sensitivity of detection by the detecting unit 142 to be high. Therefore, the detecting unit 142 can detect even a small change in the visual line direction.

When the state of use is estimated as "neither dynamic nor static" (step S208: neither dynamic nor static), the changing unit 146 ends the processing without changing the detection sensitivity of the detecting unit 142.

Figure 13A:
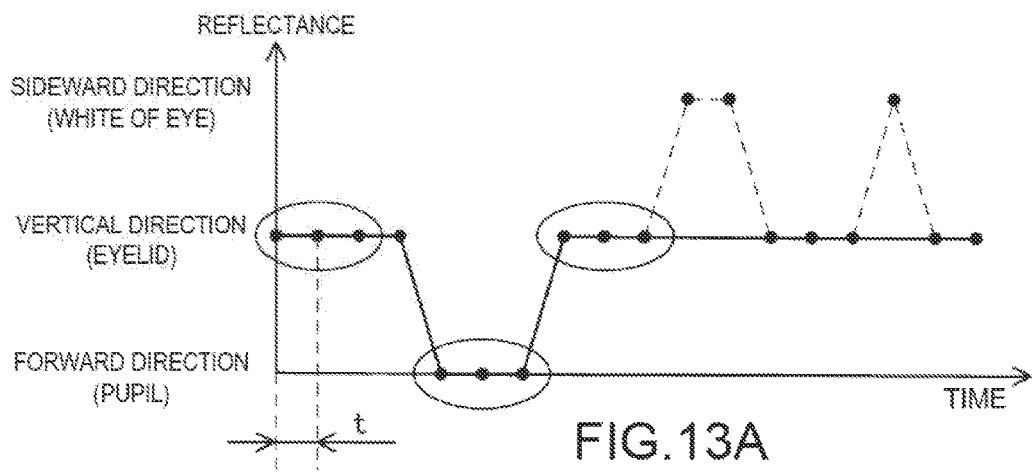
FIGS. 13A to 13C are explanatory diagrams for explaining a method of changing detection sensitivity for a visual line direction.
Figure 13B:
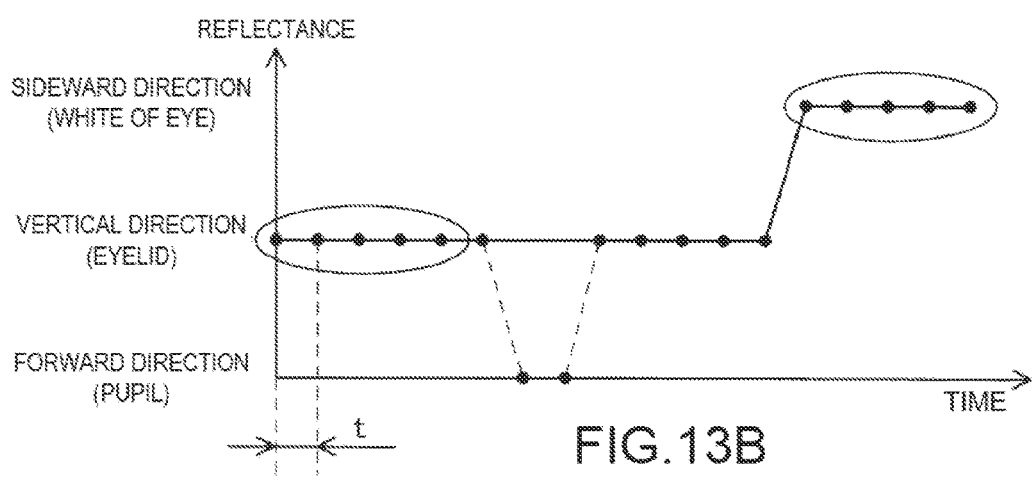
Figure 13C:
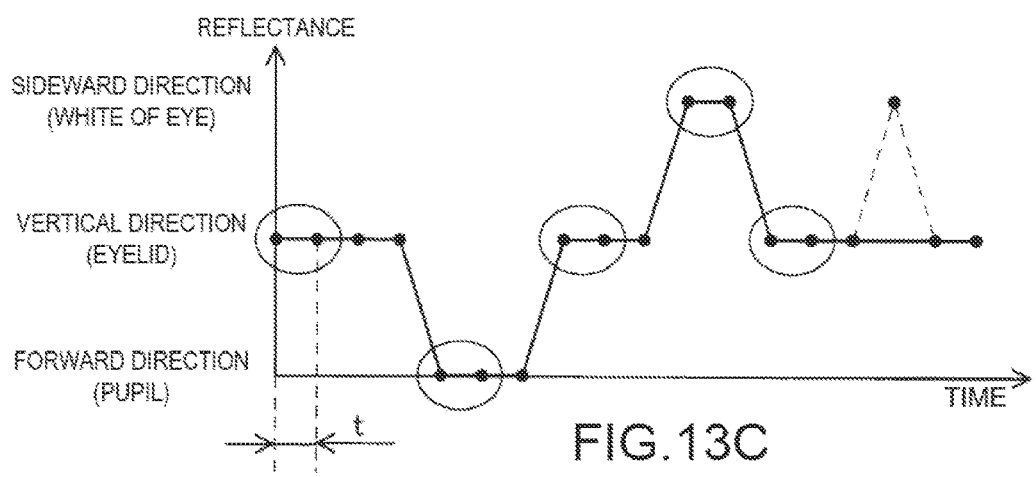

FIGS. 13A to 13C are explanatory diagrams for explaining a method of changing the detection sensitivity for a visual line direction. FIG. 13A is an explanatory diagram for explaining a state in which the detecting unit 142 in an initial state detects a visual line direction of the user on the basis of an output signal transmitted from the light receiving unit 62. In the initial state, the detecting unit 142 determines, at every time interval t for receiving an output signal transmitted from the light receiving unit 62, which of the white of eye, the eyelid, and the pupil an infrared ray hits. When the same state continues "three times or more", the detecting unit 142 detects that the state is the visual line direction of the user. Details are as explained with reference to FIG. 6B.

FIG. 13B is an explanatory diagram for explaining a state in which the detecting unit 142 receives a request for reducing the detection sensitivity and detects a visual line direction of the user on the basis of an output signal transmitted from the light receiving unit 62. The detecting unit 142 receives the request for reducing the detection sensitivity and increases the number of times "three times or more" in the initial state. In an example shown in FIG. 13B, the number of times is increased to "five times or more". Consequently, small fluctuation in the visual line direction of the user within (t×5), for example, portions indicated by broken lines in the figure are neglected. Therefore, it is possible to reduce the sensitivity for a visual line direction in the detecting unit 142.

FIG. 13C is an explanatory diagram for explaining a state in which the detecting unit 142 receives a request for increasing the detection sensitivity and detects a visual line direction of the user on the basis of an output signal transmitted from the light receiving unit 62. The detecting unit 142 receives the request for increasing the detection sensitivity and reduces the number of times "three times or more" in the initial state. In an example shown in FIG. 13C, the number of times is reduced to "twice or less". Consequently, when a state in which the visual line of the user fluctuates simply continues for (t×2), the detecting unit 142 can detect fluctuation in the visual line direction. Therefore, it is possible to increase the detection sensitivity for a visual line direction in the detecting unit 142.

As explained above, according to the second embodiment, the changing unit 146 can change the sensitivity of detection by the detecting unit 142 according to a state of use of the head mounted display 100*a* (the head-mounted display device). Therefore, the display switching unit 144 can change, according to the state of use of the head mounted display 100*a*, fine switching of the outside scent preferential display and the virtual image preferential display and rough switching of the outside scene preferential display and the virtual image preferential display. As a result, it is possible to improve convenience of use of the head mounted display 100*a* for the user.

Further, according to the second embodiment, the changing unit 146 can estimate, using the motion of the head of the user detected by the nine-axis sensor 66 (the motion detecting unit), whether a scene of use is dynamic or static and automatically change the sensitivity of detection by the detecting unit 142. As a result, it is possible to further improve the convenience of use of the head mounted display 100*a* for the user.

C. Modifications

In the embodiments, apart of the components realized by hardware may be replaced with software. Conversely, apart of the components realized by software may be replaced with hardware. Besides, modifications explained below are also possible.

Modification 1

In the embodiment, the configuration of the head mounted display is illustrated. However, the configuration of the head mounted display can be arbitrarily set without departing from the spirit of the invention. For example, addition, deletion, conversion, and the like of the components can be performed.

The allocation of the components to the control unit and the image display unit in the embodiments is only an example. Various forms of the allocation can be adopted. For example, the following forms of the allocation may be adopted: (i) a form in which processing functions such as a CPU and a memory are mounted on the control unit and only a display function is mounted on the image display unit, (ii) a form in which the processing functions such as a CPU and a memory are mounted on both of the control unit and the image display unit, (iii) a form in which the control unit and the image display unit are integrated (e.g., a form in which the image display unit is included in the control unit and functions as an eyeglass-type wearable computer), (iv) a form in which a smart phone or a portable game machine is used instead of the control unit, and (v) a form in which the connecting unit (the cord) is eliminated by configuring the control unit and the image display unit to be capable of communicating with each other by radio and capable of being supplied with electric power wirelessly.

In the embodiments, for convenience of explanation, the control unit includes the transmitting unit and the image display unit includes the receiving unit. However, both of the transmitting unit and the receiving unit in the embodiments include a function for enabling bidirectional communication and can function as a transmitting and receiving unit. For example, the control unit shown in FIG. 2 is connected to the image display unit via a wired signal transmission line. However, the control unit and the image display unit may be connected via a wireless signal transmission line such as a wireless LAN, infrared communication, or a Bluetooth (registered trademark).

For example, the configurations of the control unit and the image display unit shown in FIG. 2 can be arbitrarily changed. Specifically, the touch pad may be removed from the control unit and the control unit may be operated only by the cross key. Another interface for operation such as a stick for operation may be provided in the control unit. Devices such as a keyboard and a mouse may be connectable to the control unit. The control unit may receive inputs from the keyboard and the mouse. For example, besides the operation input by the touch pad and the cross key, the control unit may acquire an operation input by a footswitch (a switch operated by the foot of the user). For example, a visual-line detecting unit such as an infrared sensor may be provided in the image display unit. The control unit may detect a visual line of the user and acquire an operation input by a command associated with a motion of the visual line. For example, the control unit may detect a gesture of the user using a camera and acquire an operation input by a command associated with the gesture. In detecting a gesture, the control unit can use, as a mark for motion detection, the fingertip of the user, a ring worn on the hand of the user, a medical instrument held by the user, or the like. If the control unit is capable of acquiring the operation inputs by the footswitch and the visual line, even in work in which it is difficult to for the user to release the hand, the input-information acquiring unit can acquire an operation input from the user.

For example, the head mounted display is a transmissive head mounted display of a binocular type. However, the head mounted display may be a head mounted display of a monocular type. The head mounted display may be a non-transmissive head mounted display that blocks transmission of an outside scene in a state in which the user wears the head mounted display.

Figure 14A:
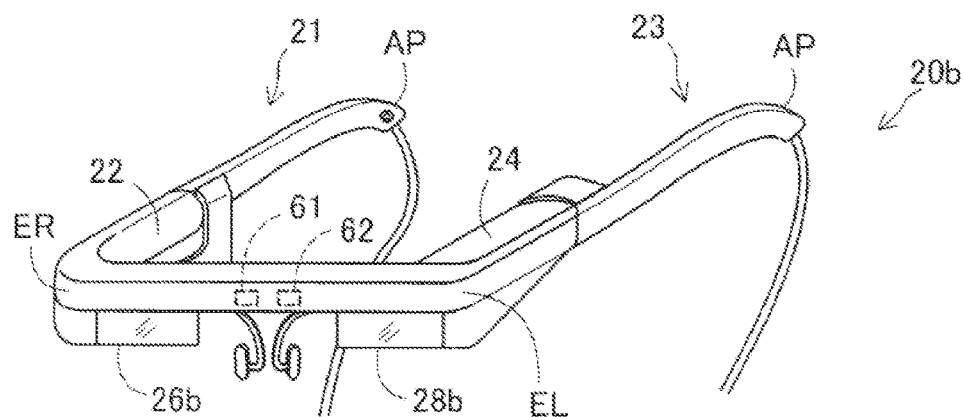
FIGS. 14A and 14B are explanatory diagrams showing the configurations of the exteriors of head mounted displays in modifications.
Figure 14B:
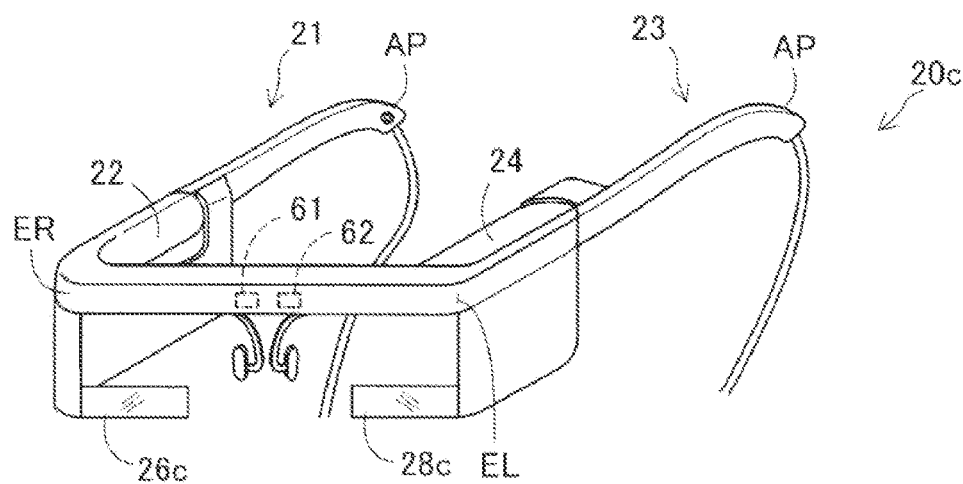

FIGS. 14A and 14B are explanatory diagrams showing the configurations of the exterior of head mounted displays in modifications. In an example shown in FIG. 14A, a difference from the head mounted display 100 shown in FIG. 1 is that the image display unit 20b includes a right optical-image display unit 26b instead of the right optical-image display unit 26 and includes a left optical-image display unit 28b instead of the left optical-image display unit 28. The right optical-image display unit 26b is formed smaller than the optical member in the first embodiment and is arranged obliquely above the right eye of the user during wearing of the head mounted display. Similarly, the left optical-image display unit 28b is formed smaller than the optical member in the first embodiment and is arranged obliquely above the left eye of the user during wearing of the head mounted display. In an example shown in FIG. 14B, a difference from the head mounted display 100 shown in FIG. 1 is that the image display unit 20c includes a right optical-image display unit 26c instead of the right optical-image display unit 26 and includes a left optical-image display unit 28c instead of the left optical-image display unit 28. The right optical-image display unit 26c is formed smaller than the optical member in the first embodiment and is arranged obliquely below the right eye of the user during wearing of the head mounted display. The left optical-image display unit 28c is formed smaller than the optical member in the first embodiment and is arranged obliquely below the left eye of the user during wearing of the head mounted display. In this way, the optical-image display unit only has to be arranged in the vicinity of the eye of the user. The size of the optical member forming the optical-image display unit is also arbitrary. The head mounted display can also be realized as a head mounted display of a form in which the optical-image display unit covers only a part of the eye of the user, in other words, a form in which the optical-image display unit does not completely cover the eye of the user.

For example, the functional units such as the image processing unit, the display control unit, the detecting unit, the display switching unit, the changing unit, and the sound processing unit are explained as being realized by the CPU expanding the computer program stored in the ROM or the hard disk on the RAM and executing the computer program. However, the functional units may be configured using an ASIC (Application Specific Integrated Circuit) designed to realize the functions.

For example, in the embodiments, the image display unit is the head mounted display worn like eyeglasses. However, the image display unit may be a normal flat display device (a liquid crystal display device, the plasma display device, an organic EL display device, etc.). In this case, as in the embodiments, the control unit and the image display unit may be connected via a wired signal transmission line or may be connected via a wireless signal transmission line. Consequently, the control unit can also be used as a remote controller of the normal flat display device.

As the image display unit, for example, an image display unit of another shape such as an image display unit worn like a cap may be adopted instead of the image display unit worn like eyeglasses. As the earphone, an ear hook type or a headband type may be adopted. The earphone may be omitted. For example, the image display unit may be configured as a head-up display (HUD) mounted on vehicles such as an automobile and an airplane. For example, the image display unit may be configured as a head mounted display incorporated in body protective equipment such as a helmet.

For example, in the embodiments, the secondary battery is used as the power supply. However, the power supply is not limited to the secondary battery. Various batteries can be used as the power supply. For example, a primary battery, a fuel battery, a solar battery, and a thermal battery may be used.

For example, in the embodiments, the image-light generating unit is configured using the backlight, the backlight control unit, the LCD, and the LCD control unit. However, the form is only an example. The image-light generating unit may include components for realizing another system in addition to the components or instead of the components. For example, the image-light generating unit may include an organic EL (organic Electro-Luminescence) display and an organic EL control unit. For example, the image generating unit can include a digital micro mirror device or the like instead of the LCD. For example, the invention can also be applied to a head-mounted display device of a laser retina projection type.

Modification 2

In the embodiments, an example of the display switching processing is explained. However, the procedure of the display switching processing is only an example. Various modifications of the procedure are possible. For example, a part of the steps may be omitted or other steps may be added. The order of the steps to be executed may be changed.

For example, the acquisition of a mode in step S102 and division of the processing according to the acquired mode may be omitted. In this case, the head mounted display switches the virtual image preferential display and the outside scene preferential display according to the visual line direction of the user. A correspondence relation among the visual line direction, the virtual image preferential display, and the outside scene preferential display may be set in advance and stored in the storing unit or may be designated by the user.

For example, in step S102, the display switching unit may acquire an operation mode using other methods instead of checking an operation mode stored in the storing unit. For example, the display switching unit may acquire an operation mode from the OS or may acquire an operation mode designated by the user via a designation screen displayed on the image display unit.

For example, in steps S110 and S120, the detecting unit detects a visual line direction of the user using an output signal transmitted from the light receiving unit. However, the detecting unit may detect a visual line direction of the user using other methods. For example, the image display unit may include, instead of the light emitting unit and the light receiving unit, a camera arranged in an inner side direction of the image display unit (a position opposed to the eye of the user in a state in which the head mounted display is mounted) and configured to photograph an image of the eye of the user. The detecting unit may analyze the image of the eye of the user photographed by the camera to thereby detect a visual line direction of the user (the forward direction, the sideward direction, or the vertical direction). For example, the image display unit includes, instead of the light emitting unit and the light receiving unit, a muscle activity sensor capable of detecting strain and relaxation of muscle around the eye of the user (e.g., corrugator muscle or orbicularis oculi muscle). The detecting unit may detect a visual line direction of the user on the basis of an output value transmitted from the muscle activity sensor.

For example, when the visual line direction of the user is the sideward direction, the display switching unit may switch the virtual image preferential display and the outside scene preferential display.

For example, the visual line direction detected by the detecting unit can be arbitrarily increased and decreased as long as the visual line direction includes the forward direction and the vertical direction. For example, the detection of the sideward direction may be omitted. For example, an oblique upward direction and an oblique downward direction may be detected.

Modification 3

In the embodiments, an example of the state estimation processing is explained. However, the procedure of the state estimation processing is only an example. Various modifications of the procedure are possible. For example, a part of the steps may be omitted. Other steps may be added. The order of the steps to be executed may be changed.

For example, the processing for estimating a state of use of the head mounted display (i.e., steps S202 to S206) may be omitted. In this case, for example, the changing unit may acquire a state of use from the OS and change detection sensitivity for a visual line direction by the detecting unit. The changing unit may acquire a state of use designated by the user via a designation screen displayed on the image display unit and change detection sensitivity for a visual line direction by the detecting unit.

For example, in steps S210 and S212, the number of times "three times" of detection in the initial state, the number of times "five times" of detection performed when the detection sensitivity of the detecting unit is reduced, and the number of times "twice" of detection performed when the detection sensitivity of the detecting unit is increased are only examples. These values can be arbitrarily changed as long as a relation "the number of times of detection performed when the detection sensitivity is increased<the number of times of detection in the initial state<the number of times of detection performed when the detection sensitivity is reduced" is satisfied.

For example, as a method of changing the detection sensitivity for a visual line direction in the detecting unit, instead of the method explained with reference to FIGS. 13A to 13C, detection sensitivity may be changed by adjusting the time interval t at which the detecting unit receives an output signal from the light receiving unit.

Modification 4

In the embodiments, the visual line direction of the user detected by the detecting unit is any one of the forward direction, the vertical direction, and the sideward direction. However, when the detecting unit can detect even an angle in the visual line direction, the display switching unit may switch the virtual image preferential display and the outside scene preferential display using conditions explained below in addition to the conditions illustrated in the embodiments or instead of the conditions illustrated in the embodiments.

The display switching unit switches the display of the virtual image to the virtual image preferential display when an angle in the visual field direction of the user is within a range of a viewing angle extending about 200° horizontally and about 125° vertically (e.g., 75° in the downward direction and 50° in the upward direction).

The display switching unit switches the display of the virtual image to the virtual image preferential display when the angle in the visual field direction of the user is within a range extending about 30° horizontally and about 20° vertically, which is an effective visual field excellent in an ability for information reception.

The display switching unit switches the display of the virtual image to the virtual image preferential display when the angle in the visual field direction of the user is within a range extending 60° to 90° horizontally and 45° to 70° vertically, which is a stable field of fixation in which a fixation point can be quickly and stably seen.

The display switching unit switches the display of the virtual image to the virtual image preferential display when the angle in the visual field direction of the user is within a range extending horizontally from about 20° at which induction of self-motion perception (vection) induced by a video starts to occur to about 110° at which the self-motion perception is saturated.

Modification 5

The invention is not limited to the embodiments, the examples, and the modifications explained above and can be realized in various configurations without departing from the spirit of the invention. For example, the technical features in the embodiments, the examples, and the modifications corresponding to the technical features in the aspects described in the summary can be replaced or combined as appropriate in order to solve a part or all of the problems or in order to attain a part or all of the effects. Unless the technical features are explained in this specification as essential technical features, the technical features can be deleted as appropriate.

The entire disclosure of Japanese Patent Application No. 2013-059593, filed Mar. 22, 2013 is expressly incorporated by reference herein.

What is claimed is:

1. A head-mounted display device that enables a user to visually recognize a virtual image and an outside scene, the head-mounted display device comprising:
   an image display unit configured to allow the user to visually recognize the virtual image;
   a detecting unit configured to detect a visual line direction of an eye of the user relative to the image display unit;
   a motion detecting unit configured to detect a motion of a head of the user a plurality of times;
   a changing unit configured to change a sensitivity of detecting the visual line direction of the eye of the user relative to the image display unit based on the motion of the head of the user; and
   a display switching unit configured to switch display of the virtual image by the image display unit between outside scene preferential display for preferentially displaying the outside scene and virtual image preferential display for preferentially displaying the virtual image based on the visual line direction of the eye of the user relative to the image display unit,
   wherein
      the visual line direction includes at least a first visual line direction associated with the virtual image preferential display and a second visual line direction associated with the outside scene preferential display,
      the virtual image is displayed in a first region of a visual field that is aligned with the first visual line direction associated with the virtual image preferential display and that is away from a second region of the visual field that is aligned with the second visual line direction associated with the outside scene preferential display,
      the motion of the head is determined to be dynamic when the motion detecting unit detects, for a predetermined number of times, that the motion of the head is greater than or equal to a first threshold value, and the motion of the head is determined to be static when the motion detecting unit detects, for the predetermined number of times, that the motion of the head is greater than or equal to a second threshold value, and
      when the motion of the head is dynamic, the changing unit changes the sensitivity of the detecting of the visual line direction to be low by increasing the predetermined number of times, and when the motion of the head is static, the changing unit changes the sensitivity of the detecting of the visual line direction to be high by decreasing the predetermined number of times.

2. The head-mounted display device according to claim 1, wherein the first visual line direction and the second visual line direction include at least a first direction in which a visual line of the user is directed to a substantially forward direction relative to the image display unit and a second direction in which the visual line of the user is directed to a substantially vertical direction relative to the image display unit.

3. The head-mounted display device according to claim 2, wherein
   the display switching unit includes at least two operation modes, including a first operation mode and a second operation mode,
   in the first operation mode, the first visual line direction associated with the virtual image preferential display is the first direction and the second visual line direction associated with the outside scene preferential display is the second direction, and
   in the second operation mode, the second visual line direction associated with the outside scene preferential display is the first direction and the first visual line direction associated with the virtual image preferential display is the second direction.

4. The head-mounted display device according to claim 1, wherein the display switching unit performs the outside scene preferential display using means for not displaying the virtual image, reducing a display size of the virtual image, thinning the display of the virtual image, or setting a display place of the virtual image in a vicinity of an end of a visual field of the user.

5. The head-mounted display device according to claim 1, wherein during outside scene preferential display, the image display unit preferentially displays the outside scene by reducing a display size of the virtual image.

6. The head-mounted display device according to claim 1, wherein during outside scene preferential display, the image display unit preferentially displays the outside scene by thinning display of the virtual image by decreasing luminance of the image display unit.

7. The head-mounted display device according to claim 1, wherein during outside scene preferential display, the image display unit preferentially displays the outside scene by adjusting at least one of a color rendering property and a color temperature of the virtual image.

8. The head-mounted display device according to claim 1, wherein during outside scene preferential display, the image display unit preferentially displays the outside scene by displaying the virtual image at a position at an end of the visual field of the user.

9. The head-mounted display device according to claim 1, wherein during outside scene preferential display, the image display unit preferentially displays the outside scene by increasing a transmittance of external light from the outside scene through the head-mounted display device.

10. The head-mounted display device according to claim 1, wherein the display switching unit switches display of the virtual image by the image display unit between outside scene preferential display for preferentially displaying the outside scene, and virtual image preferential display for preferentially displaying the virtual image, by adjusting an intensity of light of the virtual image with reference to an intensity of the external light.

11. The head-mounted display device according to claim 1, further comprising:
   a camera configured to pick up an image of the outside scene;
   wherein
      during virtual image preferential display, the image display unit preferentially displays the virtual image by applying color conversion processing to image data of the virtual image, and the color conversion processing applied to the image data is processing for intensifying a complementary color of the image of the outside scene acquired by the camera.

12. The head-mounted display device according to claim 1, wherein during outside scene preferential display, the image display unit preferentially displays the outside scene by not displaying the virtual image.

13. The head-mounted display device according to claim 1, wherein
the display switching unit includes a first operation mode and a second operation mode,
in the first operation mode, when the visual line direction is detected to be directed forward relative to the head-mounted display device, the image display unit displays the virtual image, and when the visual line direction is detected to be directed downward relative to the head-mounted display device toward a work area, the image display unit displays the virtual image at a reduced size and displays the virtual image in a vicinity of an end of the visual field of the user at a position away from the detected visual line direction, and
in the second operation mode, when the visual line direction is detected to be directed forward relative to the head-mounted display device, the image display unit displays the virtual image at a reduced size and displays the virtual image in the vicinity of the end of the visual field of the user at the position away from the detected visual line direction, and when the visual line direction is detected to be directed downward relative to the head-mounted display device, the image display unit displays the virtual image.

14. The head-mounted display device according to claim 1, wherein
the visual field has a first viewing region disposed around a center of the visual field and a second viewing region disposed around the first viewing region,
the display switching unit includes a first operation mode and a second operation mode,
in the first operation mode, when the visual line direction is detected to be directed at the first viewing region, the image display unit displays the virtual image, and when the visual line direction is detected to be directed at the second viewing region, the image display unit displays the virtual image at a reduced size and displays the virtual image in a vicinity of an end of the visual field of the user at a position away from the detected visual line direction, and
in the second operation mode, when the visual line direction is detected to be directed at the second viewing region, the image display unit displays the virtual image, and when the visual line direction is detected to be directed at the first viewing region, the image display unit displays the virtual image at a reduced size and displays the virtual image in the vicinity of the end of the visual field of the user at the position away from the detected visual line direction.

15. The head-mounted display device according to claim 1, wherein
when the visual line direction of the user is directed in the first visual line direction, the virtual image is displayed to be visible to the user at a normal display size in the first region of the visual field, and
when the visual line direction of the user is directed in the second visual line direction, the virtual image is displayed to be visible to the user at a reduced display size in the first region of the visual field.

16. The head-mounted display device according to claim 1, wherein
when the visual line direction of the user is directed in the first visual line direction, the virtual image is displayed to be visible to the user at a normal display size and the virtual image is displayed in a wide region from a center of the visual field to a vicinity of an end of the visual field, and
when the visual line direction of the user is directed in the second visual line direction, the virtual image is displayed to be visible to the user at a reduced display size and is moved to the vicinity of the end of visual field.

17. A control method for a head-mounted display device that enables a user to visually recognize a virtual image and an outside scene, the control method comprising:
(a) causing the user to visually recognize the virtual image;
(b) detecting a visual line direction of an eye of the user relative to the image display unit;
(c) detecting a motion of a head of the user over a plurality of times;
(d) changing a sensitivity of detecting the visual line direction of the eye of the user relative to the image display unit based on the motion of the head of the user; and
(e) switching display of the virtual image in the step (a) between outside scene preferential display for preferentially displaying the outside scene and virtual image preferential display for preferentially displaying the virtual image based on the visual line direction of the eye of the user relative to the image display unit,
wherein
the visual line direction includes at least a first visual line direction associated with the virtual image preferential display and a second visual line direction associated with the outside scene preferential display,
the virtual image is displayed in a first region of the visual field that is aligned with the first visual line direction associated with the virtual image preferential display and that is away from a second region of the visual field that is aligned with the second visual line direction associated with the outside scene preferential display,
in detecting the motion, the motion of the head is determined to be dynamic when it is detected, for a predetermined number of times, that the motion of the head is greater than or equal to a first threshold value, and the motion of the head is determined to be static when it is detected, for the predetermined number of times, that the motion of the head is greater than or equal to a second threshold value, and
in changing the sensitivity of detecting the visual line direction, when the motion of the head is dynamic, the sensitivity of the detecting of the visual line direction is changed to be low by increasing the predetermined number of times, and when the motion of the head is static, the sensitivity of the detecting of the visual line direction is changed to be high by decreasing the predetermined number of times.

* * * * *